United States Patent
Scime et al.

(10) Patent No.: US 12,533,731 B2
(45) Date of Patent: Jan. 27, 2026

(54) SYSTEMS AND METHODS FOR POWDER BED ADDITIVE MANUFACTURING ANOMALY DETECTION

(71) Applicant: UT Battelle, LLC, Oak Ridge, TN (US)

(72) Inventors: Luke R. Scime, Knoxville, TN (US); Vincent C. Paquit, Knoxville, TN (US); Desarae J. Goldsby, Knoxville, TN (US); William H. Halsey, Knoxville, TN (US); Chase B. Joslin, Knoxville, TN (US); Michael D. Richardson, Knoxville, TN (US); Derek C. Rose, Knoxville, TN (US); Derek H. Siddel, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/958,499

(22) Filed: Oct. 3, 2022

(65) Prior Publication Data
US 2023/0139949 A1 May 4, 2023

Related U.S. Application Data

(63) Continuation of application No. 16/950,484, filed on Nov. 17, 2020, now Pat. No. 11,458,542.
(Continued)

(51) Int. Cl.
*B29C 67/00* (2017.01)
*B22F 10/80* (2021.01)
(Continued)

(52) U.S. Cl.
CPC ............ *B22F 10/80* (2021.01); *B29C 64/153* (2017.08); *B29C 64/386* (2017.08);
(Continued)

(58) Field of Classification Search
CPC ..... B22F 10/80; B29C 64/153; B29C 64/386; B33Y 10/00; B33Y 30/00; B33Y 50/00;
(Continued)

(56) References Cited

FOREIGN PATENT DOCUMENTS

| WO | WO-2018192662 A1 * | 10/2018 | ......... H04N 1/40068 |
| WO | WO-2019125970 A1 * | 6/2019 | ............. G06N 20/00 |

OTHER PUBLICATIONS

Scime, L. et al., "Anomaly detection and classification in a laser powder bed additive manufacturing process using a trained computer vision algorithm", Elsevier, Additive Manufacturing 19 (2018), pp. 114-126.
(Continued)

*Primary Examiner* — Ryan M Ochylski
(74) *Attorney, Agent, or Firm* — Warner Norcross + Judd LLP

(57) ABSTRACT

Detection and classification of anomalies for powder bed metal additive manufacturing. Anomalies, such as recoater blade impacts, binder deposition issues, spatter generation, and some porosities, are surface-visible at each layer of the building process. A multi-scaled parallel dynamic segmentation convolutional neural network architecture provides additive manufacturing machine and imaging system agnostic pixel-wise semantic segmentation of layer-wise powder bed image data. Learned knowledge is easily transferrable between different additive manufacturing machines. The anomaly detection can be conducted in real-time and provides accurate and generalizable results.

9 Claims, 9 Drawing Sheets

Related U.S. Application Data

(60) Provisional application No. 63/107,715, filed on Oct. 30, 2020.

(51) Int. Cl.

| | |
|---|---|
| *B29C 64/153* | (2017.01) |
| *B29C 64/386* | (2017.01) |
| *G06T 3/4046* | (2024.01) |
| *G06T 3/4053* | (2024.01) |
| *G06T 7/00* | (2017.01) |
| *B33Y 10/00* | (2015.01) |
| *B33Y 50/02* | (2015.01) |

(52) U.S. Cl.
CPC .......... *G06T 3/4046* (2013.01); *G06T 3/4053* (2013.01); *G06T 7/0004* (2013.01); *B33Y 10/00* (2014.12); *B33Y 50/02* (2014.12)

(58) Field of Classification Search
CPC ..... B33Y 50/02; G06T 3/4046; G06T 3/4053; G06T 7/0004
See application file for complete search history.

(56) References Cited

OTHER PUBLICATIONS

Scime, L. et al., "A multi-scale convolutional neural network for autonomous anomaly detection and classification in a aser powder bed fusion additive manufacturing process", Elsevier, Additive Manufacturing 24 (2018), pp. 273-286.

Scime, L., "User Guide-Powder Bed Analysis Software Package", NextManufacturing, Carnegie Mellon University, Feb. 20, 2018, pp. 1-19.

Caltanissetta, F. et al., "Characterization of in-situ measurements based on layerwise imaging in laser powder bed fusion", Elsevier, Additive Manufacturing 24 (2018), pp. 183-199.

Aminzadeh, M., "A machine vision system for in-situ quality inspection in metal powder-bed additive manufacturing", Georgia Institute of Technology, Dec. 2016, pp. 1-285.

Bertasius, G. et al., "DeepEdge: A Multi-Scale Bifurcated Deep Network for Top-Down Contour Detection", arXiv:1412.1123v3, Apr. 23, 2015, pp. 1-10.

Shen, W. et al., "Multi-scale Convolutional Neural Networks for Lung Nodule Classification", Springer International Publishing Switzerland, 2015, pp. 588-599.

Abdelrahman, M. et al., "Flaw detection in powder bed fusion using optical imaging", Elsevier, Additive Manufacturing 15 (2017), pp. 1-11.

Zur Jacobsmühlen, J. et al., "Detection of Elevated Regions in Surface Images from Laser Beam Melting Process", IECON2015—Yokohama, Nov. 9-12, 2015, pp. 001270-001275.

Craeghs, T. et al., "Online quality control of selective laser melting", Katholiven Universiteit Leuven, Departement of Mechanical Engineering, Belgium, Aug. 17, 2011, pp. 212-226.

Foster, B.K. et al., "Optical, layerwise monitoring of powder bed fusion", 26th Annual International Solid Freeform Fabrication Symposium—An Additive Manufacturing Conference, Aug. 10-12, 2015, pp. 295-307.

Ronneberger, O. et al., "U-Net: Convolutional Networks for Biomedical Image Segmentation", University of Freiburg, Germany, arXiv:1505.04597v1, May 18, 2015, pp. 1-8.

\* cited by examiner

PROJECTIONS
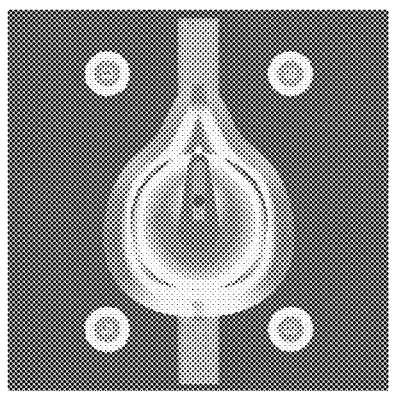
Fig. 6C
LAYER-WISE
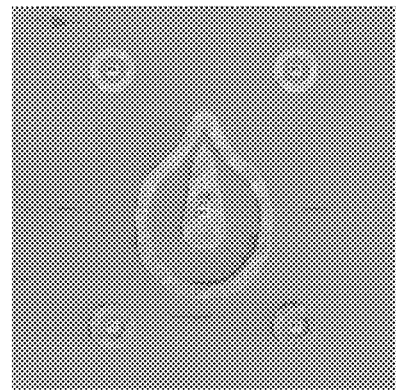
Fig. 6D
METADATA MANAGER
BUILD NAME
BUILD DATE
TRACKING ID
DATA ARE SENSITIVE
LAYER THICKNESS (mm)
SCAN ROTATION (DEG/LAYER)
PROJECTS
CUSTOMERS
MATERIAL TYPE
FEEDSTOCK BATCH
OPERATOR #1
OPERATOR #2
AMB. HUMIDITY (RH%)
AMB. TEMP (°C)
QUAL BUILD QUALITY (0-3)
NOTES
SAVE    CANCEL
Fig. 6E

SYSTEMS AND METHODS FOR POWDER BED ADDITIVE MANUFACTURING ANOMALY DETECTION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to powder bed additive manufacturing anomaly detection.

BACKGROUND OF THE INVENTION

Metal additive manufacturing is nominally well-suited for production of highly engineered or customized parts in low to medium volumes. However, many of the applicable industries (e.g., aerospace, medical implants, nuclear, and automotive) demand production of parts with higher levels of quality, better pedigree traceability, and lower rejection rates than currently can be achieved using only open loop control schema and ex-situ inspection. Relying on open loop control schema and ex-situ inspection is not practical for commercialization of these metal additive manufacturing processes.

In the last decade significant research efforts have been undertaken on the topic of layer-wise anomaly detection for powder bed additive manufacturing processes. Many of these efforts focus on developing improved sensing modalities such as using flash bulbs to better illuminate the powder bed, fringe projection techniques to recover depth information, and high resolution scanners. While helpful, improving powder bed data sources only addresses part of the challenge. It does not address how to effectively analyze the data. Some modern computer vision techniques driven by machine learning models have been implemented for powder bed anomaly detection. However, they have significant restrictions such as coarse anomaly localization resolution, a small number of discriminative anomaly classes, and a lack of generalizability to other powder bed processes, to name a few.

Referring to FIG. 1, an illustration of a representative flowchart illustrating some of the prior art image analysis software applied within a powder bed additive manufacturing environment is depicted. A single image 102 is captured for each layer of the powder bed during the additive manufacturing process, and a printer-specific image analysis algorithm 104 (e.g., image intensity thresholding, hand-crafted feature extraction, or region-based convolutional neural networks ("RCNNs") or other patch-wise machine learning techniques) is applied to analyze each image 102. Some algorithms can provide low-resolution defect detection 106 purely by analyzing the captured images, while other algorithms compare 110 the analyzed imaged layers to CAD geometry 108 to detect differences.

In general, the existing image analysis algorithms and techniques used to analyze powder bed additive manufacturing results generally require significant hand-tuning by experts and are highly specific to printer types and imaging systems. Further, practical existing techniques and commercially available software are generally limited to either low localization accuracy (i.e., detecting defects patch/region-wise) or low discriminatory power (i.e., all off-nominal regions are classified as generic "flaws"). Known image analysis algorithms and techniques that have been utilized in powder bed additive manufacturing are limited in the spatial-scale of the context in which they can observe, which limits their semantically relevant predictions. These existing techniques are hard-coded to work with one specific image system operating with one image or image-like sensing modality. Further, they operate based on one time-stamped image per layer. They also rely on traditional heuristics to flag layers of interest for printer operators; which can be cumbersome to design to behave as an operator desires. Existing techniques and commercially available software make no, or few, allowances for efficiently and automatically updating the underlying image analysis algorithms or models based on new data and printer operator feedback. Put simply, the existing and commercially available image analysis software for powder bed additive manufacturing is rudimentary.

New and improved systems and methods for producing high quality parts with powder bed additively manufacturing are desirable in order to improve commercialization prospects.

SUMMARY OF THE INVENTION

The present disclosure provides systems and methods for robust pixel-wise anomaly classification of layer-wise image data collected during powder bed additive manufacturing. The anomaly classifications are provided by a trained dynamic segmentation convolutional neural network ("DSCNN") that operates on a multi-scale input layer of image frames. The systems and methods are machine-agnostic, i.e., they can operate independently of any specific powder bed additive manufacturing machine or imaging solution.

Embodiments of the systems and methods can produce layer-wise segmentation on a desktop computer sufficient for real-time analysis of in-situ data. Anomaly classifications are provided pixel-wise, at the DSCNN native resolution, which provides high localization accuracy. The DSCNN can operate on a wide variety of different powder bed additive manufacturing machines spanning multiple distinct technologies. Furthermore, the DSCNN can handle imaging systems that include a variety of different numbers and types of imaging devices with a wide range of sensor sizes and effective resolutions. The DSCNN also allowed learned knowledge to be transferred between different powder bed machines, thereby reducing data collection and manual data labeling burdens.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 6A-E illustrate exemplary visualizations of one embodiment of a powder bed additive manufacturing anomaly detection system and method in accordance with one embodiment of the present disclosure.

DESCRIPTION OF THE CURRENT EMBODIMENT

Overview

Figure 1:
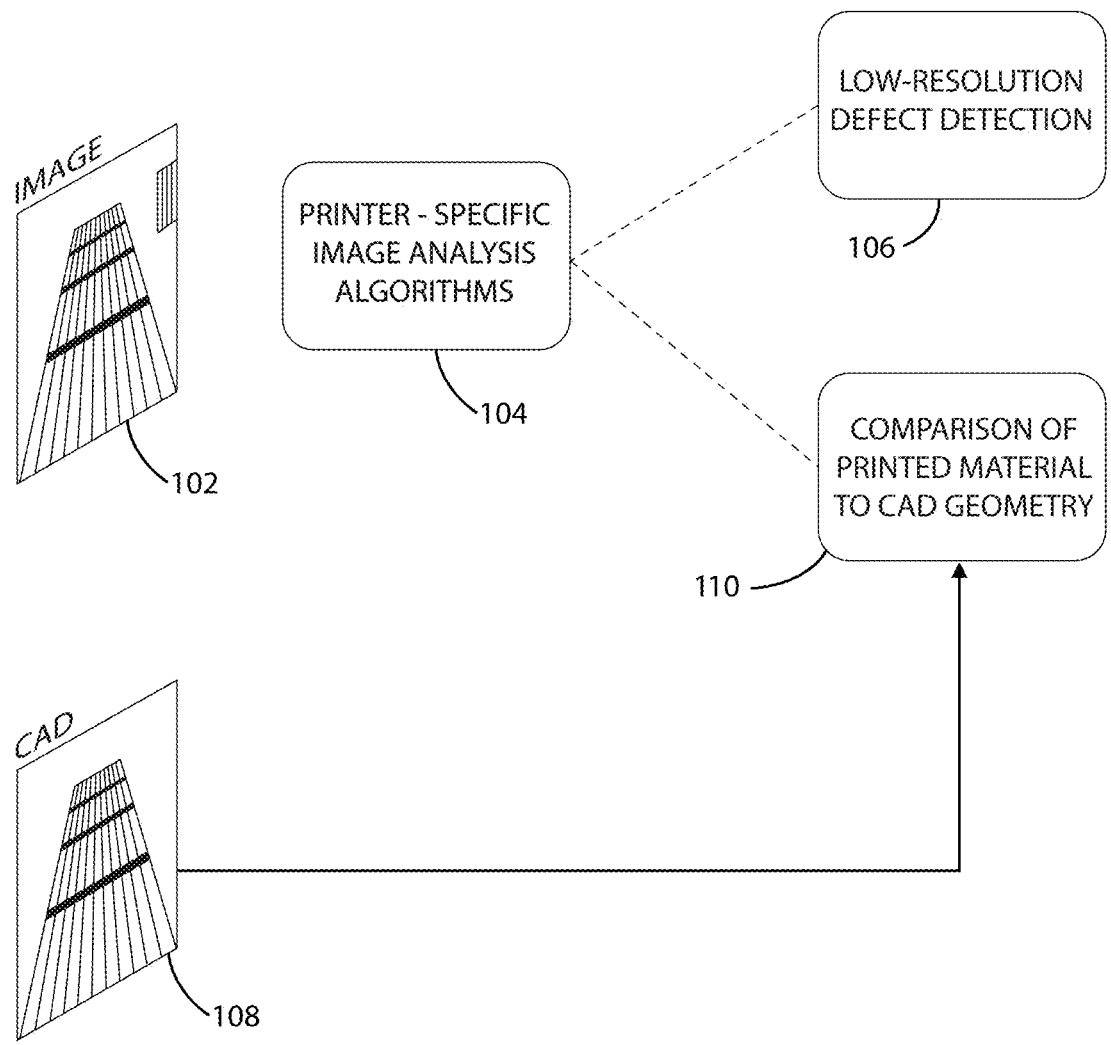
FIG. 1 illustrates a representative diagram of some known processes for powder bed additive manufacturing anomaly detection.

The present disclosure is generally directed to systems and methods for analysis of powder bed additive manufacturing processes. The systems and methods of the present disclosure leverage machine learning to provide layer-wise semantic segmentation of build layers during a powder bed additive manufacturing process. Essentially, the system and method classifies pixels of an image of the build layer as belonging to a particular anomaly or being non-anomalous. Throughout this disclosure the terms segmentation and classification and derivatives thereof are used interchangeably to refer to categorizing or labeling image data, such as predicting individual image pixels or super-pixels part depicting a portion of the part additively manufactured in the powder bed, a portion of powder in the powder bed, or particular powder bed anomalies.

One aspect of the present disclosure is directed to a dynamic segmentation convolutional neural network ("DSCNN") that provides in-situ anomaly detection for powder bed additive manufacturing machines. Another aspect of the present disclosure is directed to the DSCNN multi-scale parallel convolutional neural network architecture. Another aspect of the present disclosure is directed towards the systems and methods of the present disclosure being agnostic with respect to the powder bed additive manufacturing machine being analyzed and its particular imaging system, including both the number of imaging devices and the modalities of the imaging devices. Yet, another aspect of the present disclosure is directed to perceptron that uses deep features extracted by a DSCNN to flag specific powder bed layers for printer operator review. Utilizing DSCNN deep features instead of training a new layer-wise classification model can reduce the amount of training data for layer-wise classification by several orders of magnitude.

The systems and methods of the present disclosure can be configured, trained, and operated without special machine learning expertise, without manual tuning of parameters or hand-crafting features. That is, operators can quickly and simply (i.e., without a background in machine learning) incorporate their feedback (regarding the anomaly classification performance) into the training dataset, thereby enabling rapid improvement iterations.

Accordingly, by analyzing spatially registered layer-wise data in a deep learning framework anomaly detection systems and methods of the present disclosure can provide real-time detection of anomalies for quality control and process stability, achieve high localization accuracy, multi-modal data registration, and a fully machine-agnostic solution. Some embodiments of the present disclosure can provide real-time image segmentation in about 0.5 seconds to 2.4 seconds per layer and recognize about 17 different powder bed anomalies. The speeds and number of anomalies recognized can vary in other embodiments. This segmentation can be performed pixel-wise at a DSCNN native image resolution, i.e., a calibrated shared resolution among the images of the powder bed build layer frame from which the DSCNN tile-wise input layer is derived (in some embodiments, this is the highest resolution camera of the image system to which any lower resolution cameras are scaled during pre-processing. The software platform can support layer-wise registration of the powder bed and the deep learning architecture of the present disclosure is configured to ingest essentially any spatially mapped layer-wise powder bed information. The current embodiment can achieve a machine-agnostic solution for different powder bed additive manufacturing technologies (e.g., L-PBF, EB-PBF, and binder jet printing), different imaging systems (e.g., visible-light, MWIR, IR, and NIR cameras), and combinations thereof.

Figure 7:
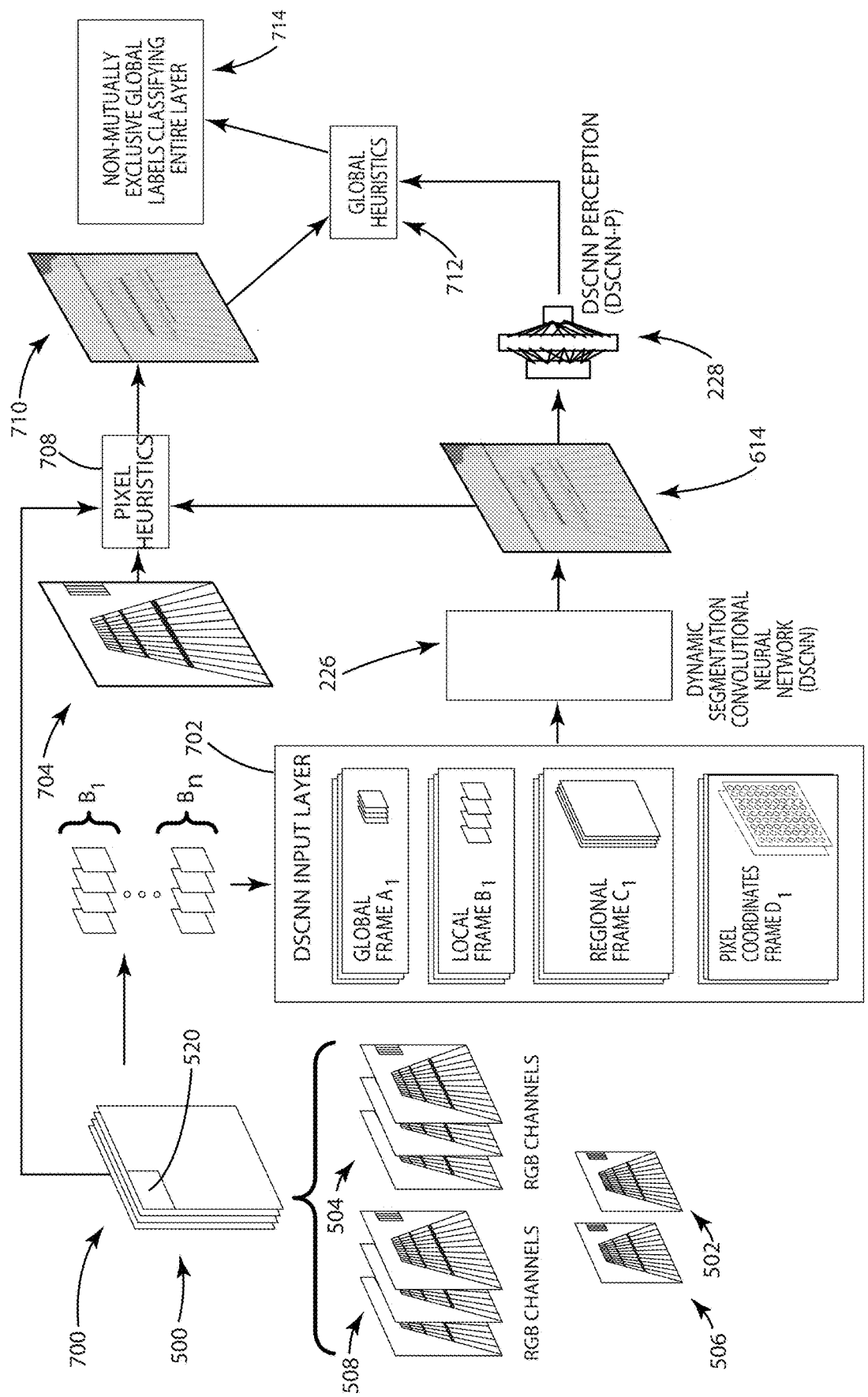
FIG. 7 illustrates a representative high level flow diagram of a powder bed additive manufacturing anomaly detection system and method in accordance with one embodiment of the present disclosure.

A high-level overview of capabilities and operation of an embodiment of a system and method of the present disclosure 700 is presented in FIG. 7, while the powder bed anomaly detection software platform internal data flow is summarized in more detail with respect to FIG. 2 below. Referring to FIG. 7, layer-wise powder bed image data received from an imaging system is bundled into a calibrated frame 500 (sometimes referred to as an image stack). In particular, a post-spreading RGB image of the powder bed

504, a post-join RGB image of the powder bed 508, post-spreading greyscale image of the powder bed 502, and a post-join greyscale image of the powder bed 506 are each resized to a common or shared pixel resolution and stored as a calibrated powder bed frame for a single build layer 500.

The images of the calibrated powder bed frame 500 are tiled with corresponding tiles. The number of tiles depends on the tile size relative to the pixel resolution. For each tile a set of four frames (global frame $A_n$, local frame $B_n$, regional frame $C_n$, and pixel coordinates frame $D_n$) is stored in memory. Collectively the sets of four frames for all the tiles of one build layer form the DSCNN input layer 702. The input layer is fed to the trained dynamic segmentation convolutional neural network ("DSCNN") model, which generates an initial segmentation r that classifies the powder bed anomalies in a pixel-wise manner 614 for the build layer. Some embodiments of the system and method return the initial segmentation for human analysis or visualization.

Other embodiments apply pixel heuristics 708 to the initial segmentation 614 to generate a final segmentation 710. Specifically, pixel classifications 614 predicted by the DSCNN can be compared to a template image 704 (e.g., derived from part CAD), the image data in the calibrated powder bed build layer frame 500, the raw powder bed image data 502-508, or some combination thereof, using pixel heuristics 708. These comparisons create the final segmentation 710 (i.e., pixel classifications) that can be returned to the powder bed anomaly software platform for observation by the user, analysis, or visualization. In addition, the output 614 of the DSCNN (i.e., pixel-wise feature vectors) can be fed into the DSCNN-Perceptron 228 to label the entire build layer. The labels assigned by the DSCNN-P can be combined with global heuristics 712 and presented to the user as powder bed layer flags 714.

Powder Bed Anomaly Detection Software Platform

Figure 2:
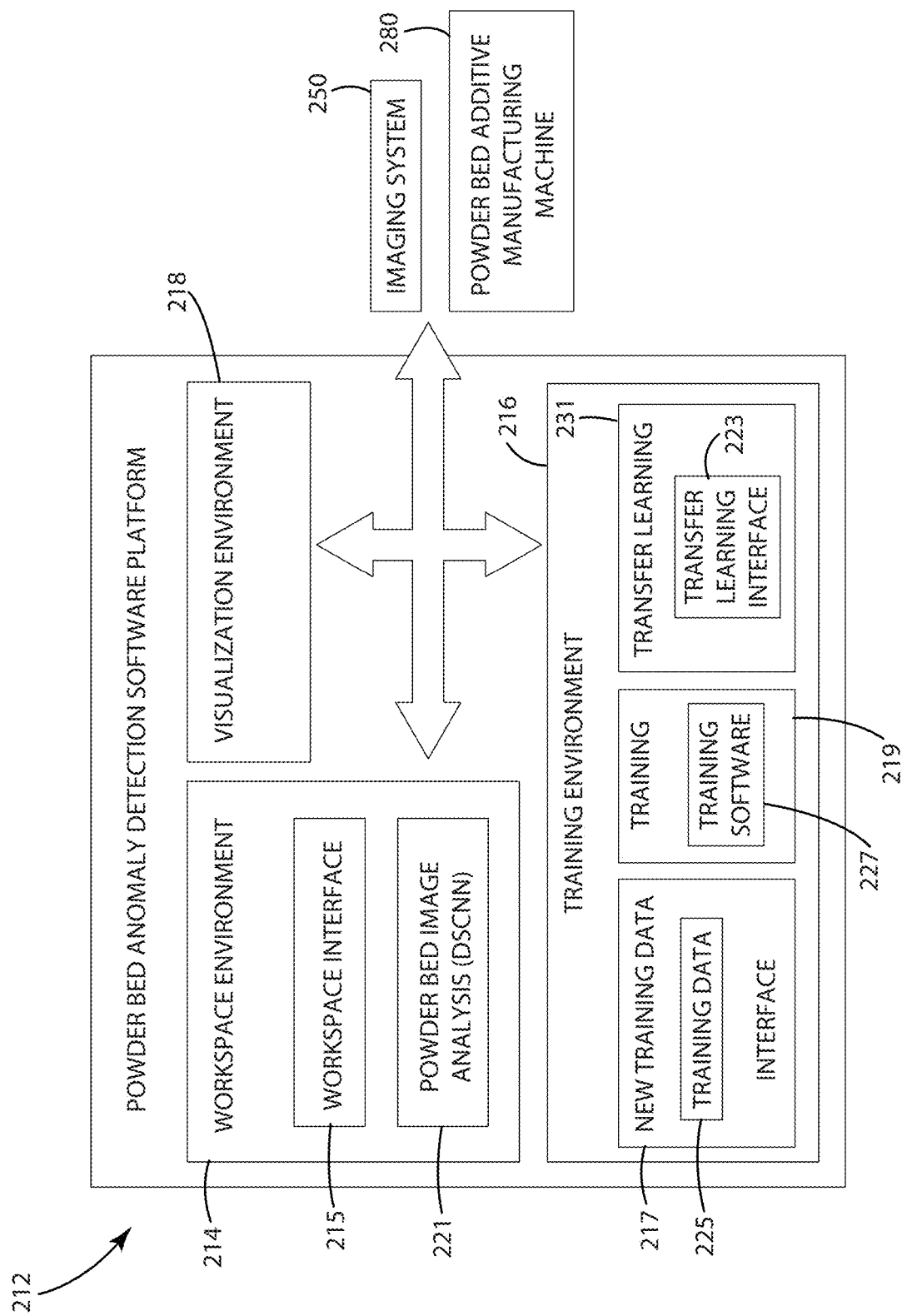
FIG. 2 illustrates a representative block diagram of a powder bed anomaly detection software platform in accordance with one embodiment of the present disclosure.

Referring to FIG. 2, an overview of one embodiment of a powder bed anomaly detection software platform 212 in accordance with the present disclosure will now be described. The software platform can monitor essentially any powder bed additive manufacturing process and provide segmentation and classification of anomalies it is trained to detect. A few examples of anomalies capable of being detected by some embodiments include recoating issues, part distortion, melt ejecta, printer malfunctions, and porosity.

Embodiments of the present disclosure can provide remote monitoring of the anomaly classification, processing intervention capabilities, tracking of metadata and part information, producing advanced visualizations of both underlying in-situ data and augmented intelligence analysis results, and enabling identification of correlations between in-situ data and process parameters or ex-situ measurements.

The software platform can be installed as a standalone software application on a computer. Alternatively, the software platform can be implemented as a distributed system with some portions installed on a remote server and some portions of the software installed on a computer local to the imaging system of the additive manufacturing equipment. In yet another alternative embodiment, the software platform can be installed entirely on a remote computer. In all of these embodiments, the powder bed anomaly detection software platform can be in communication with the imaging system, the powder bed additive manufacturing machine, or both. For example, one or two-way communication can be handled via WiFi, Bluetooth, Ethernet, Universal Serial Bus (USB), or any other communication protocol.

The different environments may correspond to functionally organized software modules. Modules of the software platform can communicate with one another, or utilize a shared memory space. Although the software platform is described in terms of these environments and modules, it should be understood that the organization structure of alternative embodiments of the powder bed anomaly detection software platform could be organized differently while still providing functionality in line with the present disclosure.

The powder bed anomaly detection software platform can be implemented essentially with any suitable programming environment. For example, Python or another programming language can be utilized to implement the powder bed anomaly detection software platform. The software platform can leverage pre-existing code libraries, such as TensorFlow 1.12.0, OpenCV 3.3.1, and Open3D 0.4.0.0, or essentially any other suitable library.

The current embodiment of the software platform 212 includes three primary environments: a workspace environment 214, a training environment 216, and a visualization environment 218. These three different environments essentially provide three different functional modes of operation and either have one all-encompassing user interface or several distinct user interfaces that can be switched between during operation. Additional, different, or fewer environments and modes of operation may be provided in alternative embodiments.

Beyond image segmentation and classification, the powder bed anomaly detection software platform can also provide various analytics and data tracking tools in the workspace environment. For example, each layer in a build can be flagged based on the DSCNN pixel segmentation results using either a set of user-defined heuristics (i.e., rules) or a learned Machine Learning model referred to as the DSCNN-Perceptron ("DSCNN-P"). The DSCNN-P can be trained to flag or label layers to focus the attention of an operator or to execute a process intervention. The user can configure custom labels per workspace. For example, additional global labels may include excessive energy input and missed powder spreading. In order to distinguish between the DSCNN and DSCNN-P during training, application of ground truths can be referred to as annotating pixels for the DSCNN and labeling layers for the DSCNN-P.

The software platform 212 workspace environment and visualization environment can operate cooperatively to provide visualizations of raw data, DSCNN, and DSCNN-P results in various formats. These visualizations can include image overlays, plots of time series data, frequency analyses, specimen quality scoring, data projections in each orthogonal plane, three-dimensional reconstructions, and time lapses of the build, to name a few.

CAD geometry information can be associated with each build in the workspace. As-built geometries can be referred to as parts and the geometries of any samples removed from the components after the build is complete (e.g., a tensile bar). The term specimen can refer to either a part or a sample. The software platform 212 or a separate software application can include programming to convert CAD geometry into a series of image slices, which can be referred to as templates.

The workspace environment 214 can be configured to track metadata for each build along with reference images, log files, coaxial time series data, and registered ex-situ data. The interface can also provide 2.5D registration capability allowing users to overlay ex-situ data, such as X-Ray Computer Tomography (XCT) slice images, on top of in-situ data and DSCNN results.

The workspace environment 214 includes powder bed image analysis software 221 that can include trained models. The software is stored in memory as machine readable instructions. It can include instructions for calibrating received powder bed images and applying a trained dynamic segmentation convolutional neural network ("DSCNN") model in order to provide pixel-wise segmentation and anomaly classification. That is, the powder bed image analysis software operates on image data received from the imaging system 250 that represents layer-wise images of a powder bed of an additive manufacturing machine 280. The images can be received (and analyzed by the software platform) in real-time during manufacture of a part. While in-situ analysis (i.e., as the part is manufactured) can be provided due to the efficiency and speed of the software platform, the software platform can also be configured for post-build analysis.

The workspace environment 214 can include a workspace interface 215. The interface that can allow a user to coordinate data collection and real-time analysis. During a live analysis, the interface can handle alert emails to operators, execute customizable macros that can interface with a printer's user interface to effect process interventions, and provide remote viewing of the build status vis a companion application installed on another device, such as a smart phone or remote computer. The interface can also provide access to statistical tools to enable investigation of correlations between in-situ results and process parameters or ex-situ measurements.

The training environment 216 provides user interfaces 223, 225 for creating new training data 217, training the DSCNN 219, and conducting transfer learning 231 from previously trained DSCNN models. The training environment 216 also includes DSCNN training software 227 for training 219 a new DSCNN model or retraining 219 an existing DSCNN model. The training software 227 can utilize new training data 217 and/or parameters learned through transfer learning 231. Ground truth training data can be generated by training users that annotate pixels from essentially any registered data source. This can include post-spreading images, post-join images, x-ray CT data, or other registered data sources. Because the DSCNN framework is machine-agnostic, the training data can be shared across different types of systems (i.e., combinations of different types of powder bed additive manufacturing machines and imaging devices). The DSCNN training software 227 can save the trained model in memory for use in a workspace and for further training.

Figure 6A:
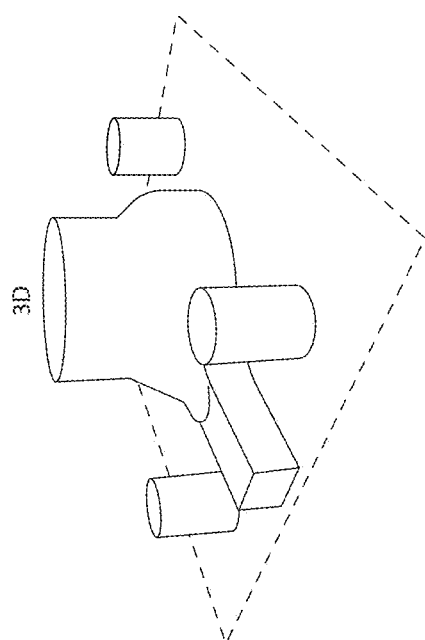
Figure 6B:
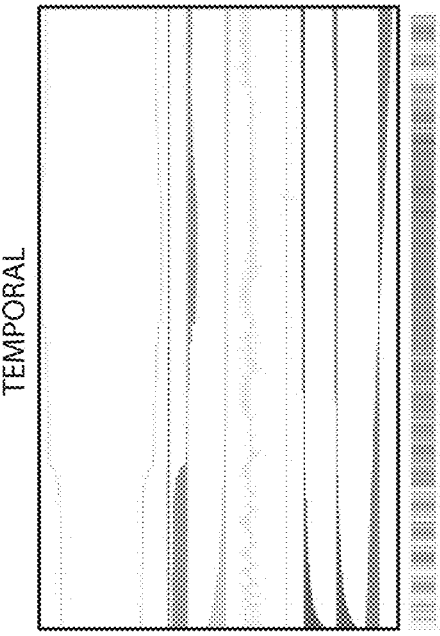

The visualization environment 218 generates visualizations for visualizing the image data and DSCNN results in various forms. For example, FIGS. 6A-E illustrate five different visualizations that can be generated by a visualization module. FIG. 6A illustrates an example three dimensional representation of a comparison between CAD data and part classification data produced by the anomaly detection. FIG. 6B illustrates a temporal data visualization. FIG. 6C illustrates exemplary projections based on build layer image data. FIG. 6D illustrates an exemplary layer image with segmentations.

Different types of visualizations can be utilized to illustrate different aspects of the powder bed and additive manufacturing process. Two-dimensional visualizations of the powder bed segmentation can illustrate the powder bed in terms of x, y coordinates measured in millimeters and an indication of the direction of travel of the recoater. The two-dimensional visualization can use color or another type of visual indicator to indicate different segmentations and also provide a key listing the different segmentations along with its representative color or indicator (e.g., powder, part, recoater hopping, recoater streaking, incomplete spreading, swelling, debris, super-elevation, soot, misprint, part geometry, support geometry, and sample geometry). Three-dimensional visualizations can also be provided. For example, in one embodiment an anomaly point cloud can be rendered for the user to navigate. The three-dimensional representation of the powder bed environment can illustrate the part being built over time along with the anomalies as they are formed. Alternatively, the point cloud can be configured to show only the anomalies that form over time. In such visualizations the portions of the powder bed labeled as powder (as opposed to part or an anomaly) may be omitted from the render or hidden from the user's view in order to provide a clearer visualization of the entire print bed (or a portion thereof). If available, the nominal Computer Aided Design (CAD) geometry of the printed parts can be incorporated for visualization purposes. Such CAD data are extracted from layer-wise slices of the 3D geometries using CV techniques functionally. Some visualizations can assist in illustrating interesting information about a particular build such as how soot increases when lasers switch, or how layer times are highly variable for thin wall sections, multi-modal data registration where the same layer can be shown through a series of different visualizations (e.g., CAD, DSCNN, scan order, on-axis photodiode, layer images). The visualizations can illustrate not only image data and classification data, but also other characteristics and information associated with the additive manufacturing process such as recoater traverse speed, measured bed temperature, build height, and layer times to name a few. It can be particularly helpful to show how these characteristics change over time relative to when/at what layer do anomalies form or become exacerbated. That is, combining this type of data with the anomaly classifications can be helpful to illustrate correlations between anomalies and certain characteristics of the additive manufacturing process. Ultimately, these correlations can be utilized to identify the root cause of an anomaly and also can be helpful in providing a tool for changing process controls to prevent or reduce anomaly generation during particular additive manufacturing situations in the future.

The visualization environment 218 can also be utilized in connection with both the training and the workspace environments. For example, visualizations of image data can be generated and provided to the user for review through the training data interface 225. The user can review the visualization to identify mistakes or anomalies (or lack thereof) in unlabeled powder bed build layer image data. The interface 225 can also include controls for annotating and labeling the visualization, which can then be translated to training data for training a new DSCNN or retraining an existing DSCNN.

Powder Bed Anomaly Detection System

Figure 3:
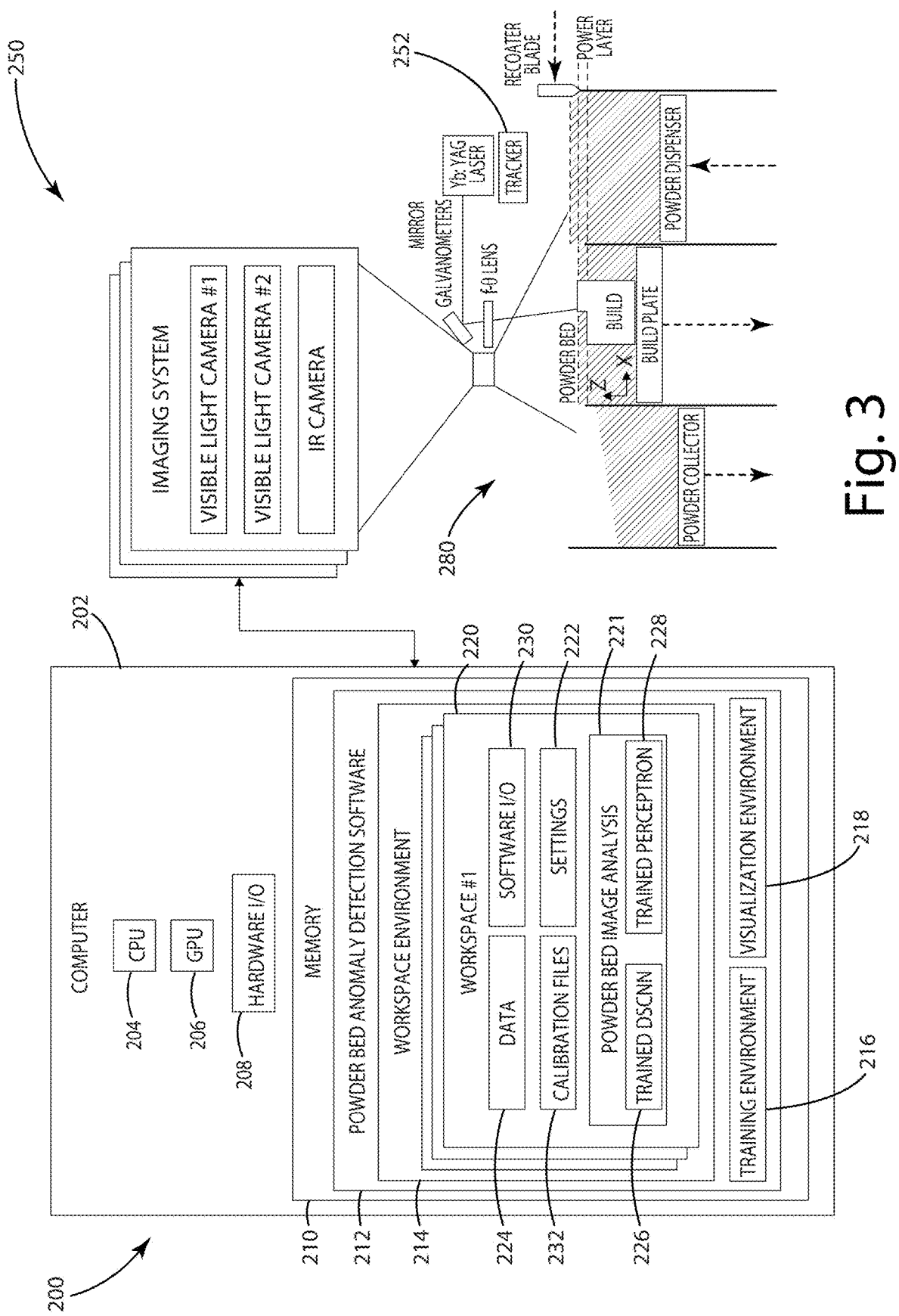
FIG. 3 illustrates a representative block diagram of a powder bed additive manufacturing anomaly detection system in accordance with one embodiment of the present disclosure that includes a computer with a powder bed anomaly detection software platform installed, an imaging system, and a powder bed additive manufacturing machine.

Referring to FIG. 3, one embodiment of a system 200 for anomaly detection based on layer-wise powder bed image data of a powder bed additive manufacturing machine is illustrated. The system 200 includes a computer 202, an imaging system 250, and a powder bed additive manufacturing machine 280.

The computer 202 includes a central processing unit 204, a graphics processing unit 206, hardware interface 208 for input and output (e.g., keyboard, mouse, monitor, wired or wireless network interface card, etc.), and memory 210. The central processing unit ("CPU") 204 can access the powder bed anomaly detection software stored in non-volatile memory 212 as well as all of the data, configuration files, settings, software I/O and subprograms (e.g., powder bed image analysis) associated therewith. In addition, the CPU can access the trained machine learning models including the trained DSCNN 226 and perceptron 228. The central processing unit can execute instructions stored in memory to perform various operations, such as the instructions associated with operating the powder bed anomaly detection software 212. Exemplary operation of the software platform 212 is discussed in more detail throughout the disclosure. The graphics processing unit ("GPU") 206 is a processing unit specifically configured for efficient and effective operation on graphics data, such as the powder bed image data captured by the imaging system 250. A variety of different types of GPUs can be included in the system. A GPU with at least 8 gigabytes of VRAM can execute the powder bed image analysis software (i.e., operate the trained DSCNN 226 and trained perceptron 228 on an input layer) in an efficient and effective manner (e.g., between 0.5 seconds and about 3 seconds per layer).

In the current embodiment, the powder bed anomaly detection software platform 212 is installed locally in computer readable memory 210. However, in alternative embodiments, portions of the system can be located remotely. For example, in one embodiment, image data is collected and communicated to a remote cloud server for analysis. It may be practical in some situations to dedicate an increased amount of resources to such a remote computer that can receive and efficiently process data from multiple remote sources. The additional resources for the server can be utilized to provide a graphics processing unit with a significant amount of VRAM and other resources that enhance performance in analyzing powder bed image data, and specifically in applying a trained DSCNN and trained perceptron to detect anomalies in layer-wise powder bed image data. Once the analysis is complete, the results can be provided to a local user computer for visualization or alternatively the data can be visualized at a remote server and the visualizations served remotely to a computer local to the user.

The software platform 212 is organized in memory as three separate environments: a workspace environment 214, a training environment 216, and a visualization environment 218.

Users can create, save, and load various workspaces. The workspaces can be established for a variety of different reasons. For example, exemplary workspace #1 220 can correspond to a particular powder bed additive manufacturing machine 280, project, or other criteria. The workspace 220 can have separate settings 222, data 224, and trained models (e.g., trained DSCNN 226 and trained perceptron 228). Each workspace can support multiple calibration files 232, such that data 224 from multiple versions of similar printers can be analyzed together. Each workspace 220 can also have its own software I/O and powder bed image analysis module 230. Depending on the configuration and programming, various workspaces 220 in the workspace environment 214 can share or inherit certain features or aspects from or with other workspaces. The workspace environment 214 facilitates multiple users sharing their work on multiple projects.

The workspace settings 222 can include additive manufacturing printer model-specific settings, AM printer serial number-specific calibrations, AM printer serial number-specific configurations, to name a few different settings 222 that can be stored in connection with a workspace. Other examples of settings can include live camera configurations The data 224 can be stored in one or more databases, data warehouses, or other types of data structures in memory 220. The data 224 can include a variety of different types of data including received image data (e.g., multi-modal image data) from the imaging system 250, output from the powder bed image analysis module 230, training data, testing data, design-intent registration data associated with the parts being additively manufactured (e.g., computer-aided design files), powder bed additive manufacturing build layer characteristic information (e.g., recoater direction, timing, temperature readings, g-code, or other information available from the AM machine or its sensors directly or sensible by one or more external sensors), and historical performance data, to name a few types of data that can be stored in memory associated with the powder bed anomaly detection software.

The powder bed anomaly detection software 212 can also provide a visualization or analysis environment 218 to view an analyzed build. The results from a powder bed image analysis 230 can be visualized in a number of different ways. For example, as shown in FIGS. 6A-E, the classifications of the various portions of the powder bed can be shown via a 3D image of the part, projections of the powder bed, layer-wise, temporal, and through metadata, to name a few ways to visualize a build analysis. Suffice it to say, essentially any known powder bed anomaly visualization can be integrated into the powder bed anomaly detection software.

Although the present disclosure involves a standalone software application for a special purpose computer having a graphics processing unit, other programmable electronics can be programmed to carry out the functions described herein, including some embodiments, which can be configured to operate in conjunction with a general purpose computer that does not include a separate graphics processing unit. The anomaly detection system 200 may additionally or alternatively include other electronic components that are programmed to carry out the functions described herein. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in another manner, whether combined into a single unit or distributed across multiple units. When physically distributed, the components may communicate using any suitable serial or parallel communication protocol, such as, but not limited to SCI, WiFi, Bluetooth, FireWire, I2C, RS-232, RS-485, and Universal Serial Bus (USB).

Embodiments of the present disclosure are well suited for essentially any type of powder bed additive manufacturing process. Several different types of powder bed additive manufacturing machines and underlying technologies will now be briefly described.

Laser Powder Bed Fusion ("L-PBF") is where one or more focused laser beams are used to selectively melt powder. Electron Beam Powder Bed Fusion ("EB-PBF") is where a magnetically-steered electron beam is used to selectively melt the powder bed, and binder jetting, is where binder is deposited on the powder bed using an inkjet printer head to temporarily hold the powder in place until being fully joined by sintering or infiltration in a furnace. The system 200 is illustrated with an L-PBF additive manufacturing machine 280, but the anomaly detection system 200 is machine-agnostic and can operate in conjunction with essentially any powder bed additive manufacturing machine.

It is generally known that additively manufactured components in general can be particularly prone to deterministic (but difficult to model) anomalies such as sub-optimal thermal histories, stochastic defects, such as porosity, process stability issues that can cause build failures, and general machine errors. Many powder bed additive manufacturing anomalies are large enough for layer-wise detection. Embodiments of the present disclosure provide systems and methods for layer-wise detection of anomalies via automated analysis of image data collected from powder bed additive manufacturing processes. In many embodiments, the analysis can be conducted in real-time.

One somewhat common area of powder bed additive manufacturing process involves metal additive manufacturing ("AM") and encompasses a wide range of technologies that produce complex three-dimensional components through layer-wise addition of material. Some of the embodiments of the present disclosure focus on metal AM, however, it should be understood that the systems and methods for anomaly detection are not limited to metal AM processes and also apply to other, non-metal powder bed AM techniques.

Powder bed metal AM processes share a number of precepts that can be helpful in understanding the examples set forth throughout this disclosure, but do not limit the embodiments of the disclosure. A thin layer (e.g., 20 μm-200 μm) of powdered metal feedstock is spread across a substrate using a recoating mechanism. A two-dimensional cross-section of the desired component is then joined (e.g., either fused using a targeted heat source or bound together using a binder). Next, the substrate is lowered by the height of a powder layer and the process is repeated until the build is complete.

The systems and methods of the present disclosure can detect and classify semantically diverse anomalies at the pixel-level, maintaining a localization accuracy equal to the resolution of the input image data. In general, embodiments of the present disclosure utilize a dynamic segmentation convolutional neural network ("DSCNN") that incorporates contextual information at multiple size scales in order to make semantically-relevant anomaly classifications. One embodiment is organized as three parallel convolutional neural networks: a large-scale context that may capture information about environmental lighting conditions, material feedstock characteristics, or an anomaly's location within the powder bed, a medium-scale context that may capture morphological information, and small-scale context that may include textural information and can be used to enhance localization accuracy.

It should be understood that because the systems and methods of the present disclosure can detect anomalies, they can also be configured to detect conformance as well. That is, while the systems and methods of the present disclosure can classify pixel-wise images to differentiate between various types of anomalies produced by powder bed manufacturing processes, so too can the systems and methods identify non-anomalous pixels too where the process has accurately additively manufactured the part without producing an anomaly.

Several examples of the types of anomalies will now be discussed to provide additional context. Some anomalies are common to all or more powder bed additive manufacturing techniques, while others may be specific to a particular technology or grouping of technologies. Recoater hopping occurs when a rigid recoater blade impacts a part just below the powder surface and can be characterized by repeated lines perpendicular to the recoater travel direction. Recoater streaking occurs when a recoating mechanism is either damaged or dragging a relatively large contaminant across the powder bed and can be characterized by a line parallel to the recoater travel direction. Incomplete spreading (sometimes referred to as short feed) is where an insufficient amount of powder is spread across the powder bed in one or more layers. Debris is a broad classification used to describe small-to-medium scale disturbances on the powder bed. Spatter is generated during melting of the powder bed and typically consists of ejecta from a molten pool or melted but unconsolidated powder particles. Soot is spatter imaged at a lower effective resolution. Swelling and super-elevation are evident when a part warps up above the powder bed, e.g., as the result of residual thermal stresses or swelling from excessive energy input. Porosity, e.g., lack-of-fusion porosity in the EB-PBF process, generally encompasses a range of small-scale defects. For example, some porosity can be surface-visible because of geometry-induced change in emissivity in the near infrared ("NIR") wavelength range.

The anomaly classification can be combined with additional information regarding intended part geometry in order to distinguish part damage from debris or other anomalies. The systems and methods of the present disclosure typically classify areas of a layer of the powder bed with no anomalies as "powder" while anomaly-free joined (e.g., fused or bound) powder regions can be classified as "part".

Unlike many anomalies, jet misfires and misprints may not be visually distinct from the part being additively manufactured. Jet misfires and misprints refer to where powder is joined in unintended locations. In some embodiments, these types of anomalies can be detected by comparison of part classifications to intended geometry.

Accordingly, the systems and methods of the present disclosure can operate in conjunction with essentially any type of powder bed additive manufacturing equipment 280. Further, as discussed in more detail below, the dynamic segmentation convolutional neural network architecture can enable transfer learning between not only different additive manufacturing equipment that use the same powder bed additive manufacturing technology, but also across different additive manufacturing equipment that do not utilize the same underlying powder bed additive manufacturing technology. Examples of additive manufacturing equipment capable of operation in conjunction with the systems and methods of the present disclosure include: EOS M290 (L-PBF), ConceptLaser M2 (L-PBF), Renishaw AM250 (L-PBF), ExOne M-Flex (binder jetting), and Arcam Q10 (EB-PBF). For sake of brevity and because they are generally well understood, visualizations of various different types of anomaly classifications are omitted from this disclosure. For example, detailed examples of several anomalies and visualizations thereof are discussed in L. Scime, J. Beuth, "Anomaly detection and classification in a laser powder bed additive manufacturing process using a trained computer vision algorithm", Addit. Manuf. 19 (2018) 114-126, https://doi.org/10.1016/j.addma.2017.11.009 and L. Scime, J. Beuth, "A multi-scale convolutional neural network for autonomous anomaly detection and classification in a laser powder bed fusion additive manufacturing process," Addit. Manuf. 24 (2018) 273-286, https://doi.org/10.1016/j.addma.2018.09.034, both of which are incorporated by reference in their entirety.

Having described the computer 202 and the various different types of additive manufacturing machines 280 that work in conjunction with the system, the imaging system 250 and examples of variations that can work in conjunction with the system of the present disclosure will now be briefly described.

The imaging system 250 can include one or more imaging devices (e.g., cameras or imaging sensors). Each imaging device can capture images of the powder bed during manufacture and provide them to the computer 202 for use in connection with the powder bed anomaly detection software. Each imaging device has a particular field of view that generally covers the entire powder bed, sometimes referred to as print area. The imaging system can include visible light cameras, infrared cameras (e.g., near-infrared NIR, mid-wave infrared (MWIR) cameras), or other types of imaging devices capable of sensing image data associated with the print area. The imaging systems may include a light system to provide or enhance illumination to improve the quality of the images.

A pixel-flow motion tracking system 252 can communicate with the imaging system to track the status of the build process and automate activation of the imaging devices to capture images of the powder bed. That is, the pixel-flow motion tracking system can monitor the additive manufacturing process and instruct the imaging system to capture an image of each layer of the powder bed as it is built in real-time. The various imaging devices can simultaneously capture images in response to instructions from the tracking system. Alternatively, the tracking system or the image system 250 can coordinate sequential imaging from the devices of the image system to reduce any interference.

In some embodiments, multiple images per imaging device are captured for each layer. For example, in the current embodiment, one image is captured by each camera following powder join (e.g., fusion or binder deposition) and another by each camera following powder spreading. The post-spreading image can be linked to the previous post-join image. This arrangement emphasizes that the powder spread essentially probes the topology of the just-joined layer. In alternative configurations, temporal images, if captured, can be linked in a different manner. The images can be provided to the computer 202 raw or after some on-device processing.

By way of example, the various imaging systems associated with six different additive manufacturing machine setups are listed in Table 1 along with various other characteristics, including print area, camera type, raw size in pixels, calibrated size in pixels, and spatial resolution in μm/pixel. Though not limited to such, the exemplary cameras can capture images having a raw size between about 1 Megapixel ("MP") to 15 MP at a field of view that generally covers the entire powder bed, sometimes referred to as print area. Raw image size is generally not a limitation so long as the images can be calibrated, alternative imaging systems may include cameras or camera configurations that can capture significantly larger raw size images (e.g., 20 to 50 MP or higher). The imaging system can include visible light cameras, infrared cameras (e.g., mid-wave infrared ("MWIR") or Near infrared ("NIR")), or other imaging devices capable of sensing image data or image-like data associated with the print area.

TABLE 1

| AM Machine | Powder Feedstock | Print Area (mm) | Camera Type | Raw Size (pixels) | Calibrated Size (pixels) | Spat. Res. (μm/pixel) |
|---|---|---|---|---|---|---|
| EOS M290 | Ti64, AlSi10Mg, 718, 625, 316L, 17-4 PH, & bronze | 250 × 250 | visible | 1024 × 1280 | 875 × 875 | 290 |
| ConceptLaser M2 | 316L | 240 × 240 | visible | 2048 × 2560 | 2325 × 2325 | 110 |
| Renishaw AM250 | Fe—3Si | 30 × 30 | visible | 3288 × 4608 | 1530 × 1530 | 20 |
| Arcam Q10 | Ti64 | 200 × 200 | NIR | 2050 × 2448 | 1632 × 1632 | 120 |
| ExOne M-Flex | H13, B4C, & SiC | 250 × 400 | visible & MWIR | 2748 × 3840 640 × 512 | 1581 × 2346 | 130 |
| ExOne Innovent | B4C & SiC | 65 × 160 | visible | 3672 × 5496 | 1922 × 4731 | 30 |

Some embodiments of the present disclosure are machine agnostic, both with respect to additive manufacturing machine 280 and imaging system 250. To facilitate discussion of such features, a table is presented below that identifies a few different additive manufacturing machines and imaging system configurations capable of use with embodiments of the present disclosure. It should be understood that these powder bed additive manufacturing machines and imaging systems are merely exemplary systems and configurations, other additive manufacturing machines and imaging systems, with different configurations, can be used in essentially any combination.

Method of Detecting Anomalies in Powder Bed of Additive Manufacturing Machine

Figure 4:
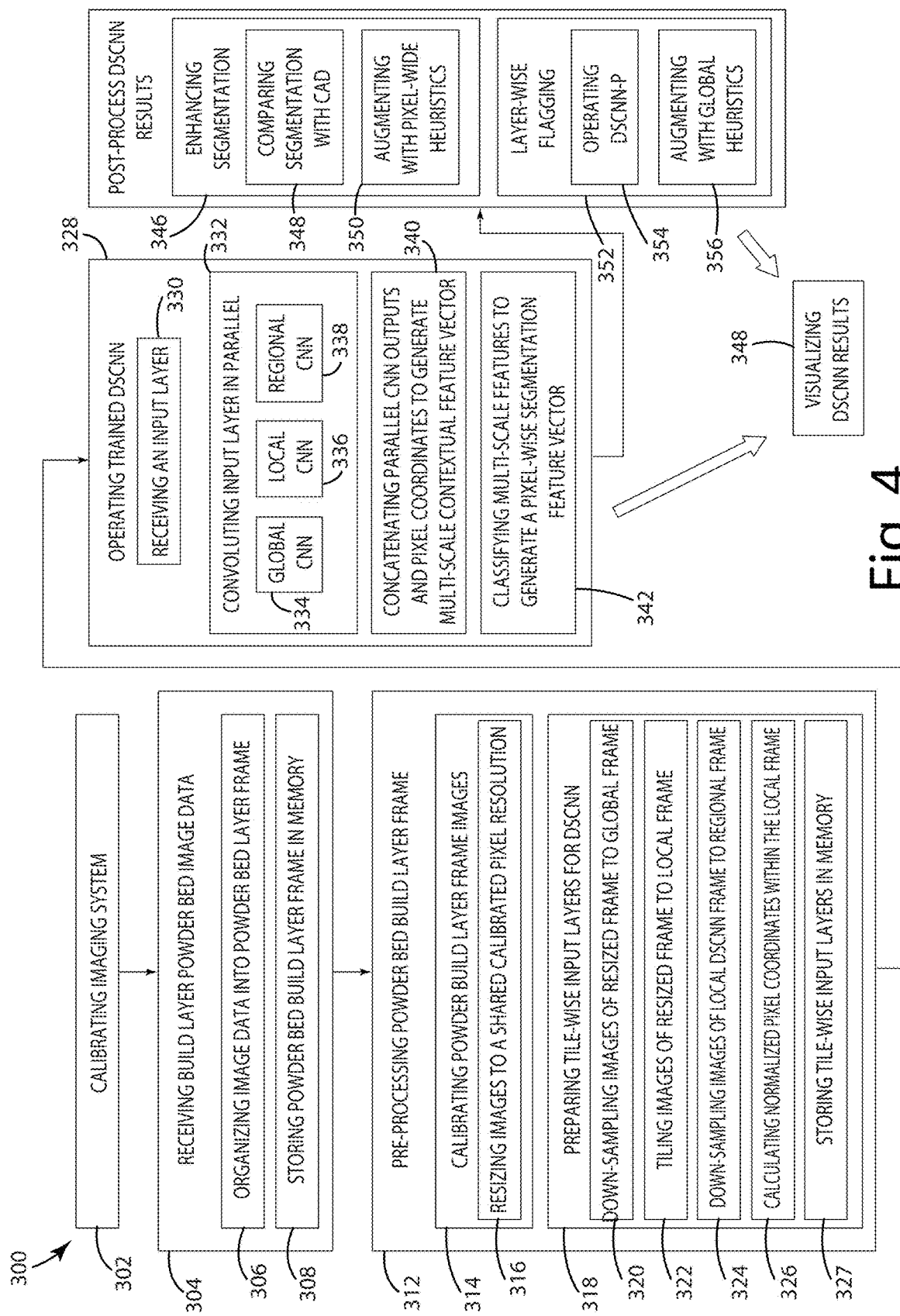
FIG. 4 illustrates a flowchart of a powder bed additive manufacturing anomaly detection method in accordance with one embodiment of the present disclosure.

Referring to FIG. 4, one embodiment of a computer-implemented method 300 for anomaly detection based on layer-wise powder bed image data of a powder bed additive manufacturing machine is illustrated.

The method 300 may optionally include calibrating the imaging system 302. The calibrating can be performed according to defined camera calibrations stored in memory on the computer or the imaging devices themselves or by conducting a recalibration procedure.

The method 300 includes receiving layer-wise build layer powder bed image data from an imaging system 304. The image data can be provided in real-time as the additive manufacturing build is occurring. As or after the image data for a layer is received, it can be organized into powder bed build layer frame 306 and stored in memory 308.

The powder bed build layer frame undergoes some pre-processing 312 before being input into the trained DSNN. The pre-processing generally includes calibration 314 and converting the calibrated powder bed build layer frame into the proper format as an input layer for the DSCNN 318. The pre-processing includes resizing the frame images to a shared calibrated pixel resolution 316 and then preparing the input layer by down-sampling 510 the images of the resized frame to form a global frame 320, tiling the images of the resized frame to form a local frame 322, down-sampling 530 the images of the local frame to form a regional frame 324, calculating normalized pixel coordinates for the local frame 326, and storing the global frame, local frame, regional frame, and normalized pixel coordinates frame for each tile in a DSCNN input layer in memory 327.

Figure 8:
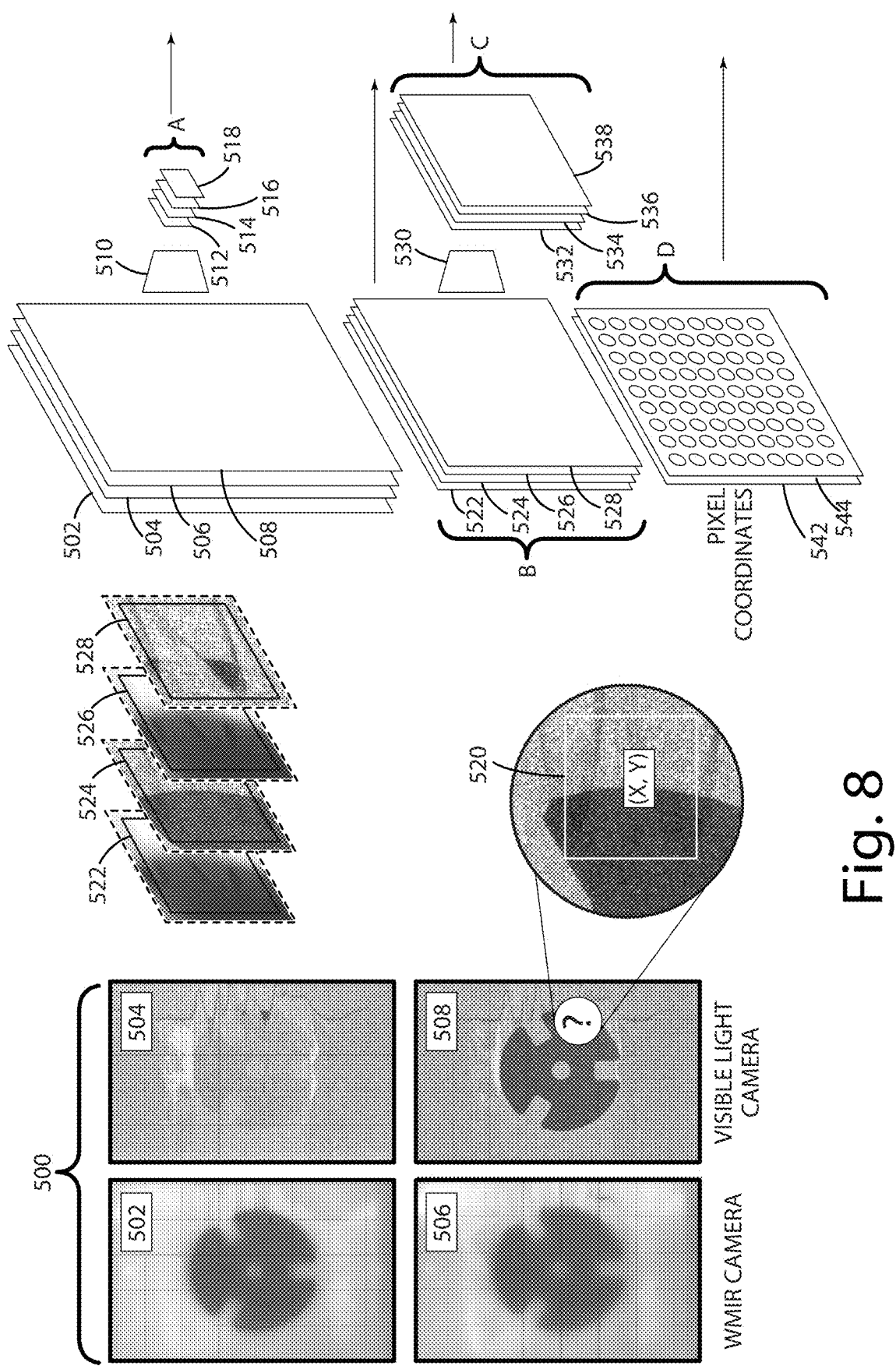
FIG. 8 illustrates a representative flow diagram of preparation of a dynamic segmentation convolutional neural network input layer in accordance with one embodiment of the present disclosure.

The pre-processing can perhaps best be understood with reference to FIG. 8, which illustrates a graphical representation of a conversion of an exemplary calibrated powder bed build layer frame 500 to a tile-wise input layer ($A_n$, $B_n$, $C_n$, $D_n$) for ingestion by a DSCNN, where n represents the subject tile. That is, in the current exemplary embodiment a total of four frames (i.e., stacks): global frame A, local frame B, regional frame C, and pixel coordinates D, are extant for each tile and together these sets of four frames for each tile form the DSCNN input layer 702 (see FIG. 7). In alternative embodiments, the input layer to the DSCNN may be organized in a different manner. For example, additional frames at a different scale can be included in the input layer to provide access to additional hidden context for extraction with another DSCNN leg.

This aspect of the present disclosure relates to conversion of a calibrated powder bed build layer frame 500 of calibrated powder bed images (502, 504, 506, 508) into an input layer (A, B, C, D) suitable for the DSCNN. Because of the DSCNN architecture, the input layer (A, B, C, D) is flexible. Virtually any image data (e.g., images or image-like data) captured layer-wise during a powder bed printing process can be bundled, stacked, or otherwise organized into a suitable power bed build layer frame for application of the DSCNN. For example, an arbitrary number of images of a powder bed layer can be included in the power bed build layer frame so long as they are calibrated to have the same calibrated size in pixels, sometimes referred to as shared pixel resolution. Other, future or previous, applications of the same DSCNN can have a different calibrated size.

By way of example, details for the exemplary workspace environment of an ExOne M-Flex additive manufacturing printer are provided in Table 1 and discussed herein. The associated imaging system includes two explicit channels in the form of two separate cameras, a visible light camera and a mid-wave infrared camera. They are configured to transmit, to a computer running anomaly detection software, captured images of the powder bed captured in-situ while the ExOne M-Flex additively manufactures a part. The visible light camera is configured to capture images with a pixel resolution of 2748×3840 while the MWIR camera is configured to capture images with a pixel resolution of 640×512. Pixel resolution can be referred to as raw size or dimensions in terms of pixels, typically pixel resolutions are expressed by the number of pixels in the width of the image and the number of pixels in the height of the image.

The computer can process the images. This can be done in response to receiving the images in real-time. In particular, the computer can scale (i.e., resize) the images to a common resolution, which can be referred to as a resized shared pixel resolution, a shared calibrated pixel resolution, shared calibrated image size, a calibrated size in pixels, a calibrated pixel resolution, or something similar. The raw fields of view of the various imaging devices of the imaging system likely may not be perfectly identical and may be sufficiently different that some image processing can be helpful before the resizing. Because the fields of view of the cameras of the imaging system are generally larger than the powder bed, the images can be cropped while keeping the entire print area in the cropped field of view. Accordingly, an image processing program can be run on the computer processor that automatically crops the images to a common field of view that includes the entire print area, before resizing the images to the common resolution. That can improve the ultimate quality of the DSCNN classification. One example of such calibration according to a target reference frame includes delineating a field of view for a calibration image corresponding to a printable area within the powder bed by marking (e.g., marking four corners and selecting collinear points along edges with a workspace user interface) a target field of view, cropping the layer-wise powder bed image data to the field of view for the selected explicit channel according to the target reference frame, generating perspective, lighting, and color corrections, and storing calibration settings in a calibration file.

Although images from both cameras are scaled in this example because the shared calibrated pixel resolution is different from the raw pixel resolution of the images provided by both cameras, if instead one or both of the cameras were configured to provide images with a raw size matching the shared calibrated pixel resolution, then rescaling of those images can be forgone because they are already the correct size.

The computer can be configured with software to determine whether received raw images should be resized. For example, a comparison can be performed in a variety of ways to make the determination. In one embodiment, the raw image size of a sample image from each camera is compared to a shared (i.e., target) calibrated image size and a determination made that images from that camera should be rescaled if the resolutions do not match. The comparison may be performed one time, saved in a configuration file, and/or at one or more selected times (e.g., upon camera startup, anomaly detection software startup, camera resolution change, or shared pixel resolution change) because received raw images from a camera typically continue to be captured at the same raw pixel resolution until reconfigured. The raw image size or result of the comparison may be indicated in an image device configuration file. The shared calibrated image size may be defined in a DSCNN setting, automatically assigned, or set in another way. For example, a powder bed image analysis module may be configured to automatically assign the largest raw image size (or according to some other criteria, such as smallest raw image size, average raw image size, or a pre-defined pixel resolution from a list matching one of the raw image sizes provided by one of the cameras) from among received images in a powder bed layer frame as the shared calibrated image size.

By resizing the raw images to a common resolution (i.e., calibrated pixel resolution) and due to the underlying structure of the DSCNN, the parameters learned from the DSCNN are agnostic to both the particular powder bed additive manufacturing machine and the particular imaging system on which the parameters are learned. That is, although the images received from the imaging system of the particular powder bed may be resized during-preprocessing, that resizing is not particular to or dependent upon the characteristics of the imaging system or the characteristics of the powder bed additive manufacturing machine.

Referring back to FIG. 4, it should be noted that the images, imaging system, and additive manufacturing system may be calibrated in a variety of other additional ways 314 other than merely being scaled to a shared calibrated pixel resolution. For example, as a preprocessing step, the images of the powder bed build layer frame can be calibrated to correct the field of view, perspective distortion, and lighting artifacts. These and other calibrations can be utilized to improve the quality of the input data, which ultimately can improve quality of the segmentations and classifications provided by the DSCNN and perceptron, respectively. Calibrations and other settings can be stored in memory associated with a particular workspace for application of an instance of the DSCNN. These calibrations and other settings may or may not be machine agnostic (to the additive manufacturing machine and imaging system). It should be noted that these calibrations and settings can be utilized in connection with embodiments of the present disclosure without departing from the spirit of the machine agnostic aspect. That is, while the additional settings and calibrations may be specific to the imaging devices of the imaging system or the additive manufacturing machine, the images ultimately provided to the DSCNN will still be machine agnostic for application of the DSCNN so long as they have a shared calibrated pixel resolution.

Put another way, the additional machine specific settings and calibrations do not affect the machine agnosticism of the transferability of the learned parameters from the DSCNN. By pre-processing 312 the images of the powder bed frame to a single shared resolution, which is not specific to the imaging system or additive manufacturing machine, the DSCNN can reliably convert the images of the powder bed frame, e.g., by down-sampling and tiling, into multiple input frames (sometimes referred to as image stacks) at different scales for operation by parallel convolutional neural networks configured to extract multi-scale features. In particular, the multi-scale features and parallel architecture of the DSCNN cooperate to provide learned parameters that can be applied to other workspace environments, even workspace environments that utilize a different imaging system and/or a different additive manufacturing machine.

Suitable image data for the input layer can originate from an arbitrary number of explicit channels. For example, separate imaging devices, such as cameras, imaging sensors, or the like can form separate explicit channels. Each explicit channel can also include an arbitrary number of implicit channels, such as the number of color channels (e.g., one, three, or four). The term arbitrary refers to the unspecified nature of the number of explicit and implicit channels that can be accepted due to the input layer architecture.

By way of additional examples, the input layer can be configured to accept image data:
- of any bit color depth, for example, eight bit color depth and sixteen bit color depth images;
- any modality (e.g., visible light images and infrared images); or
- stored in essentially any image file format, for example common image file formats such as portable network graphics ("PNG"), joint photographic expert group image ("JPEG"), tagged image file format ("TIFF"), or bitmap ("BMP");

Referring back to FIGS. 3 and 8, preparing the input layer for the DSCNN 318 will now be discussed in detail with respect to the exemplary calibrated powder bed build layer frame 500.

In order to explain how the calibrated powder bed frame 500 is converted to the input layer, the architecture of the current embodiment of the dynamic segmentation convolutional neural network ("DSCNN") will be discussed. The DSCNN includes multiple parallel convolutional neural networks ("CNNs"). CNNs perform a sequence of operations on data stored in memory within an input layer. In a trivial case, a CNN input layer may include a resized grayscale image of width W and height H. Similarly, the input layer of a CNN designed for RGB color images may be a stack of three images of size H×W with each image of the stack considered a "channel." In the case of the DSCNN of the current embodiment, the input layer is more complex because it can include image data from multiple camera images of each layer while architecturally ensuring that contextual information at larger size scales can be effectively leveraged during pixel-wise classification. The components of the input layer for the current embodiment of the DSCNN for a given tile are identified in FIG. 8 as sets of four image frames: global frame $A_n$, local frame $B_n$, regional frame $C_n$, and normalized pixel coordinates frame $D_n$.

In the current embodiment, the input layer of powder bed data (A, B, C, D) is derived from both a calibrated post-spreading and a calibrated post-join (e.g., fusion/binder-deposition) image for each camera, in this case an MWIR camera and a visible light camera. Perhaps as best shown in FIG. 8, one calibrated powder bed build layer frame 500 is illustrated that includes four images, a calibrated MWIR camera post spreading image 502, a visible light camera post-spreading image 504, a calibrated MWIR camera post-join (e.g., post fusion/binder-deposition) image 506, and a calibrated visible light camera post-join (e.g., post fusion/binder-deposition) image 508.

Referring to FIG. 4, global frame A can be generated by down-sampling 500 each of the four image of the calibrated powder bed build layer frame 320. Referring back to FIG. 8, global frame A can be generated by down-sampling 510 each of the four images 502, 504, 506, 508 of the calibrated powder bed build layer frame 500. In particular, the four images are resized (e.g., down-sampled via bilinear interpolation) from the shared calibrated pixel resolution to a global pixel resolution, in this embodiment 32 pixels by 32 pixels. This image stack can be padded with two symmetric pixels to a size of 36 pixels×36 pixels. Global information of interest may include large-scale disturbances to the powder bed as well as global lighting levels (e.g., if the room lights were turned on or off during data collection), powder feedstock characteristics, or other global features ascertained by analysis of data beyond the extents of a single tile. Accordingly, the global frame A dimensions are 36 pixels× 36 pixels×4 images, with the four images being denoted by 512, 514, 516, and 518. The global pixel resolution is exemplary for the global frame, larger or smaller pixel resolutions can also be used as suitable global scale resolutions.

A set of frames (A, B, C, D) can be generated for each tile because the DSCNN is operated tile-wise. However, it is worth noting that the global frame A will be the same with every tile because it is derived from the entire image. Accordingly, global frame A need not be calculated for each tile, and instead can be calculated once and then copied or linked to the other frames or fed to a single global CNN for a given tile. That is, referring to FIG. 7, instead of generating global frames $A_1$-$A_n$, a single global frame A may be generated and fed to the DSCNN with each group of frames (A, B, C, D). Or, a single global frame A may be fed to the DSCNN global CNN leg one time and its result concatenated with the DSCNN results for each tile. Accordingly, a suitable input layer for a trained DSCNN is configured to encode the build layer frame 500 at multiple scales for segmentation. That is, the encoding can include storing copies of the frames (A, B, C, D) in memory, storing addresses of dynamic links in memory to the frames, or otherwise organizing a mapping between the build layer frame 500 and the DSCNN input layer 702.

The local frames $B_n$ of the input layer (A, B, C, D) can be generated by dividing or breaking up each image of the powder bed layer input frame 500 into a fixed grid of tiles 520. The tiles 520 are sized to capture contextual information at a local size scale. The tiles 520 contain not only accessible local information (i.e., information about individual tile pixels and the local surrounding tile pixels), but also hidden regional context (i.e., information about the tile generally, such as morphological features, that is not easily accessible in this form). The corresponding tiles 522, 524, 526, 528 from each image 502, 504, 506, 508 of the calibrated frame 500 can be grouped together as one local frame $B_n$. A copy of the grouping of the corresponding tiles 522, can be stored as a frame or image stack at their native resolution of T×T.

In order to provide access to the hidden regional context of the tiles 520, the tiles can be shrunk to a smaller pixel resolution (e.g., by using bilinear interpolation). By downsampling the tiles in this way (e.g., to 128×128 pixels) it makes the regional context more accessible but at the cost of losing the local information. The corresponding downsampled images 532, 534, 536, 538 can be grouped together as one regional frame $C_n$, which can be stored as a frame or image stack for the DSCNN input layer. At this lower pixel resolution the DSCNN regional leg can access the regional context information of regional frame $C_n$ and extract morphological features or other features that are not accessible or at least as easily accessible at the local size scale.

The normalized ∈=[−1,1] (x, y) coordinates, relative to the center of the powder bed, for each pixel can also be captured as a two channel pixel coordinate frame D (i.e., image stack). That is, one channel corresponds to the global location of the pixel along the x-axis while the other channel corresponds to the global location of the pixel along the y-axis. By way of example, each pixel coordinate frame D can include two sets of image information 542, 544 (i.e., two images or two sets of image-like data). Both sets of image information 542, 544 include a representation of coordinates for each pixel within the native tile resolution. One set of image information 542 includes a representation of the global location of each pixel within the native tile resolution along the x-axis within the calibrated shared powder bed pixel resolution, which is the resolution of images 502, 504 506, 508. Similarly, another set of information encodes the pixel location along the y-axis. Because the images all share the same resolution, the pixel coordinates 542, 544 can map the tile pixel coordinates to any of the calibrated images 502, 504, 506, 508. Certain powder bed anomalies (e.g., incomplete spreading) are more common in some locations of the powder bed than others. That is, some anomalies have prior probability distributions which are sensitive to their location on the powder bed and therefore the pixel coordinates can be useful in the DSCNN.

As mentioned above, the input layer is tile-wise, which means the input layer includes or is associated with frames (A, B, C, D) generated for each tile.

Suitable tile sizes for each AM machine can be determined in a variety of different ways. The tile pixel dimensions can be defined or set based on the scale at which a particular anomaly of interest or set of anomalies of interest. For example, the tile size can be set based on the expected size of the anomaly (or average size of the anomalies), how easy the anomalies are to identify or distinguish, a predefined list of common tile sizes, as a function of the input frame calibrated shared pixel resolution, or essentially any other suitable criteria. Given the relative time savings afforded by leveraging a DSCNN in the anomaly detection software, it is also feasible and efficient to seek a domain expert to assist with suitable selection of tile size.

If the calibrated powder bed frame 500 images are not evenly divisible by the tile pixel dimensions. T×T, the final tiles (i.e., along the right and bottom edges of the image assuming tiling is performed from left to right and top to bottom) can be pinned to the image borders and overlap some of the previous tiles. In order to address this issue, when the tile-wise DSCNN classifications are reconstructed into the full image, the processor can be configured to have edge tiles control and overwrite any overlapping pixels.

The tile sizes of the current embodiment are squares, though in other embodiments the tile dimensions may not be square. The native square sizes of the tiles can vary by AM machine. By way of example, for the AM machines listed in Table 1, the native square tile sizes are listed in parenthesis after the name of the machine: EOS M290 (128), Concept-Laser M2 (225), Renishaw AM250 (200), ExOne M-Flex (400), ExOne Innovent (450), and Arcam Q10 (200) with all values in pixels. One copy of each tile remains at the native resolution (See FIG. 8 local frame B including four tiles 522, 524, 526, 528 each having a T×T native pixel resolution). While another copy is resized (using bilinear interpolation 530 in this case) to 128 pixels×128 pixels (See FIG. 8 regional frame C) including four down-sampled tiles 532, 534, 536, 538 each tile having a 128×128 pixel down-scaled resolution.

Each native-resolution tile can be padded, e.g., in the current embodiment each tile is padded with five surrounding pixels 540 (or symmetric pixels if at the true edge of the powder bed image) to mitigate artifacts at the tile boundaries. This results in a final pixel size of T+10 pixels×T+10 pixels. The resized tile can be padded with two pixels resulting in a final size of 132 pixels×132 pixels for the local frame B images.

The amount of padding to maintain layer outputs of identical size to the layer inputs is generally half of the corresponding initial kernel widths, which are listed in Tables 2-4 below for the current embodiment of the DSCNN. The tiles from both the post-spreading and post-join images are stacked together into two channels per camera, resulting in a number of channels given by $2n_{cam}$. This approach to sensor fusion allows the DSCNN to learn relationships between the data modalities. For example, the DSCNN may learn that a fused part is extant at a given pixel if there is a significant difference in the pixel intensities between the post-spreading and post-fusion images. Similarly, some anomalies may only be apparent in an infrared wavelength while others may be more prominent in the visible range.

Referring back to FIG. 4, description of an embodiment of a method of detecting powder bed additive manufacturing anomalies 300 will continue with description of operating a trained DSCNN 328.

Operation of the DSCNN generally includes receiving an input layer 330. FIG. 7 illustrates how a DSCNN input layer 702 for one build layer of a powder bed can be formed with sets of global frames A, local frames B, regional frames C, and pixel coordinates frames D. There is a separate group of frames generated for each tile 600, which is shown in FIG. 7 by labeling the frames in the DSCNN input layer with subscripts (i.e., $A_1$ $B_1$ $C_1$ $D_1$) and offset boxes. The sets of frames may be organized in memory in a variety of different ways. The frames may be organized in the DSCNN input layer in memory by frame type, by tile, both, or by some other characteristics. Although each frame is illustrated with just a few offset boxes to illustrate quantity of frames, it should be understood that in the current embodiment the number of each type of frame generally corresponds to the number of tiles. As discussed elsewhere herein, there can be a common exception with respect to the global frame A.

Operation of the DSCNN begins by convoluting the input layer in parallel 332 with three separate parallel convolutional neural networks (CNNs). Specifically, operation proceeds for each tile, n, by convoluting the global frame $A_n$ with the global CNN 334, convoluting the local frame $B_n$ with the local CNN 336, and convoluting the regional frame $C_n$ with the regional CNN 338. The specific operation of the CNNs will be discussed in more detail with respect to the DSCNN architecture and Tables 3-5. The outputs of the parallel CNNs are concatenated together and with the pixel coordinate frame $D_n$ to generate a multi-scale contextual feature vector 340. The multi-scale contextual feature vector 340 is fed to a classification layer, which classifies the multi-scale feature vector to generate a segmentation feature vector 342 for each pixel that has a length equal to the number of classes. As discussed in more detail with respect to the architecture, a softmax layer can rescale the vector as pseudo-probabilities as part of the classification/segmentation.

The results of the classification can be returned to the software platform for presentation to the user, e.g., in raw form, in a visualized form, or in some other form 348.

Instead of returning the results of the classification or in addition, the method can include some post processing 344. In one embodiment, the segmentation is enhanced 346 by comparing the segmentation results with CAD of the part and/or powder bed image data, such as images from the calibrated powder bed frame 348. Pixel heuristics can be utilized with the comparison to revise and enhance the pixel-wise segmentation 350.

Figure 9:
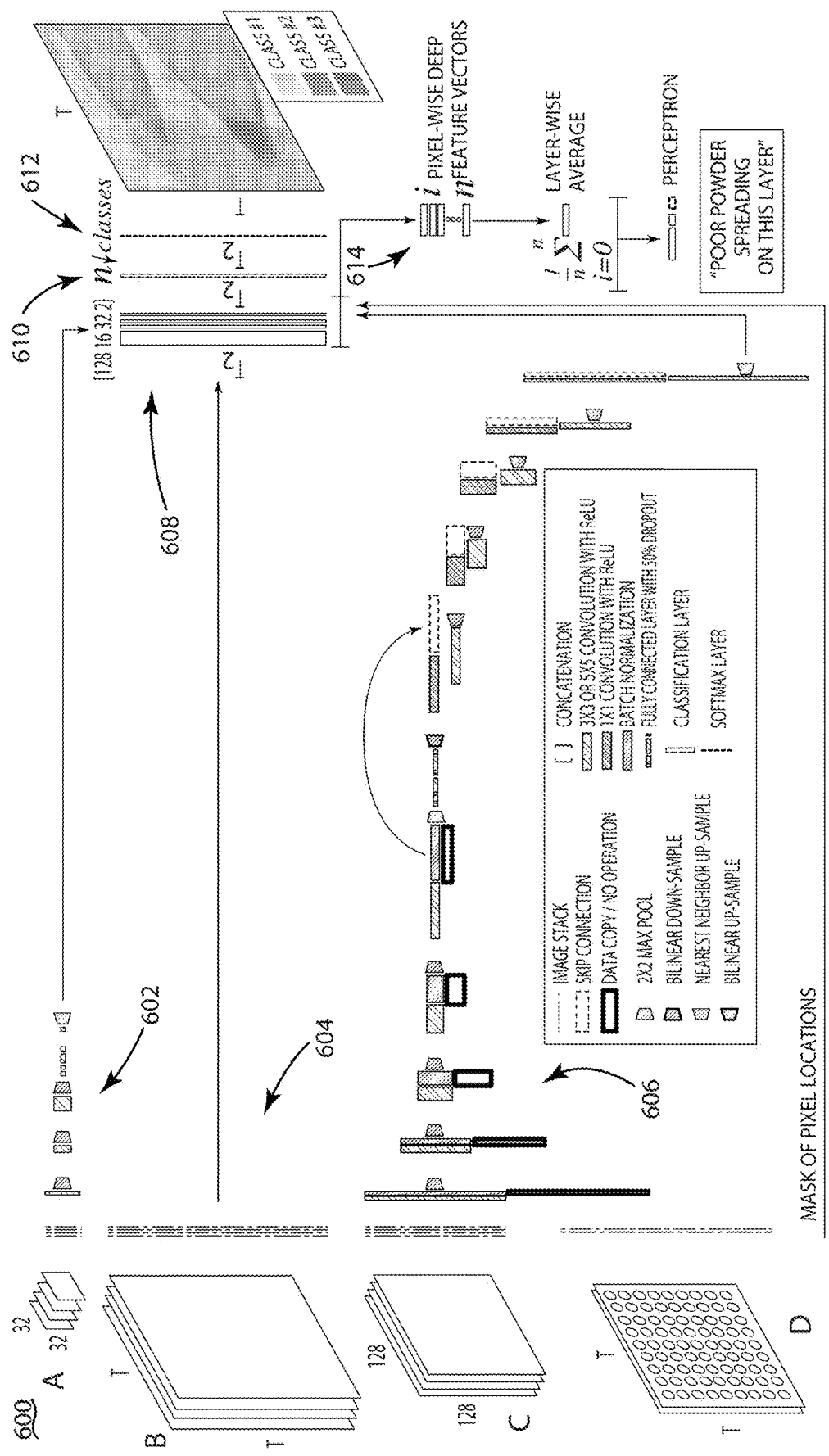
FIG. 9 illustrates a representative flow diagram of operation of a dynamic segmentation convolutional neural network in accordance with one embodiment of the present disclosure.

The post processing can also include layer-wise flagging 352 where certain layers are flagged for the user to identify a particular feature or set of features. For example, if a particular layer has a significant number of anomalies or a significantly large anomaly, that layer can be flagged for user review. The flags can be generated by operating a DSCNN perceptron 354. Perhaps as best shown in FIG. 9, the trained perceptron can accept the layer-wise average of the pixel-wise deep feature vectors and output a label, such as "poor powder spreading on this layer." Put another way, the segmentation feature vectors from the DSCNN input layer 702 for an entire build layer can be input into a DSCNN Perceptron (DSCNN-P) to generate layer-wise classifications.

The layer-wise classifications can be utilized in conjunction with the initial segmentation feature vectors or the pixel heuristically enhanced segmentation feature vectors, along with global heuristics, to obtain global heuristically enhanced non-mutually exclusive global labels that classify an entire powder bed layer 356.

The pixel-wise enhanced classification and the layer-wise classification or flags can be returned to the software platform for presentation to the user, e.g., in raw form, in a visualized form, or in some other form 348.

Training the DSCNN

Before discussing the architecture of the DSCNN in detail, a description of systems and methods for training the DSCNN is provided. Training a CNN generally involves a significant amount of ground truth data, typically on the order of $10^5$-$10^7$ targets (i.e., labeled samples). In some circumstances transfer learning can mitigate the amount of labeled samples. Transfer learning refers to a process by which low-level feature extractors are learned using a large but generic dataset (e.g., pictures of cats and dogs) and only the final layers of the CNN are learned using the smaller dataset of interest. While effective, the unusual architecture of the DSCNN precludes transfer learning from such a generic dataset. Fortunately, because the targets are pixels instead of patches, collection of millions of labeled samples is achievable with a manageable labor cost.

Ground truth data can be collected in essentially any manner. Suffice it to say, one way in which ground truth can be collected for use with embodiments of the present disclosure is through manual pixel-wise annotation of powder bed images from multiple layers, multiple builds, and multiple AM machines, for example by expert powder bed additive manufacturing operators. A custom graphical interface can be utilized to label layers of data, with each layer-wise dataset including a calibrated image taken after powder-spreading and a calibrated image taken after powder-join for each camera or other imaging device.

The training sets utilized to train the DSCNN have a meaningful impact on classification quality. In general, the robustness and accuracy of the DSCNN model can be improved by increasing the training data set size and its compositional variety. Higher quality predictions can be provided by training the DSCNN on data that adhere to the following guidelines for each machine type, where possible:

Obtain sufficient data. Obtain a sufficient representation of anomaly classes that the DSCNN will be classifying. While class-wise balance can be accounted for by embodiments of the present disclosure, sufficient labels for each anomaly should be included in the training data, for example, in one embodiment at least 100,000 labeled pixels for each class is sufficient.

Prioritize variety. Priority should be placed on ensuring that rare situations are well-represented. Such variety can include capturing both thin- and thick-wall part geometries, unusual incomplete spreading behavior, and atypical debris morphologies, among other rare situations.

Label multiple builds. To enhance the variety of training data, labeling data from only a single build should be avoided where possible.

Co-location. Some anomaly classes are co-located. A consistent set of rules should be used to determine an appropriate label. Prioritizing more detrimental anomaly classes over comparatively minor issues is generally favored. For example, super-elevation is generally a more serious issue than incomplete spreading, as is it indicates a direct interaction between the anomaly and the part geometry.

Label Full Stack. Because the DSCNN leverages the full stack of input images, all of the images for a given layer (e.g., post-spreading and post-fusion temporal images for each camera) should be considered during annotation.

Full Coverage. Because the physical location of each pixel of images of the powder bed is an input to the DSCNN, training data should include labeled pixels from all regions of the powder bed.

Multiple Layers. A sufficient number of different layers of training data should be provided for each machine type. For example, in one embodiment, at least three layers of labeled data for each machine type was deemed sufficient for reasonable model accuracies when combined with transfer learning.

The DSCNN can be prone to overfitting during training due to the textural features associated with the powder bed images. The robustness of the DSCNN can be improved by augmenting the training data with noise distributions.

Table 2 below provides an accounting of exemplary training data for training the DSCNN. The table specifies the total number of pixels labeled for each AM machine and a class-wise breakdown of the training data. The balance of the training data includes unlabeled pixels, which are excluded from the loss calculations. For all machine types, the relative occurrences of the different anomaly classes within the training database varied substantially; with some classes accounting for as much as 83.2% or as little as 0.1% of the labeled data. While full labeling of images or tiles is preferred, if a tile or image is only partially labeled, it can still be considered during training, with the unlabeled pixels being excluded from the loss calculations.

TABLE 2

|  | EOS M290 | ConceptLaser M2 | Renishaw AM250 | Arcam Q10 | ExOne M-Flex | ExOne Innovent |
|---|---|---|---|---|---|---|
| Number of Builds | 8 | 12 | 1 | 1 | 10 | 10 |
| Number of Layers | 37 | 23 | 3 | 4 | 14 | 13 |
| Number of Pixels ($10^6$) | 33 | 90 | 8 | 7 | 36 | 132 |
| Anomaly Class | | | | | | |
| Powder | 83.2% | 71.8% | 73.5% | 44.7% | 63.5% | 80.5% |
| Part | 3.1% | 12.8% | 25.2% | 41.1% | 17.6% | 13.1% |
| Recoater Hopping | 1.3% | — | — | — | — | — |
| Recoater Streaking | 0.7% | 0.2% | — | — | 0.6% | 0.5% |
| Incomplete Spreading | 5.2% | 3.0% | — | — | 4.0% | 5.1% |
| Swelling | 0.1% | 0.1% | 0.1% | — | — | — |
| Spatter | — | — | 1.2% | — | — | — |
| Soot | — | 0.2% | — | — | — | — |
| Debris | 2.7% | 0.4% | — | — | 3.1% | — |
| Super-Elevation | 1.2% | 0.4% | — | — | — | — |
| Part Damage | 0.0%[a] | — | — | — | — | — |
| Porosity | — | — | — | 0.2% | — | — |

[a]The part damage class is not directly learned, it is predicted according to heuristics in the current embodiment.

Powder bed anomalies are prone to class-wise imbalance in the training data. For example, if 90% of all pixels belong to class #2, then if the DSCNN always guesses class #2, the accuracy would still be close to 90%, which is generally not the desired behavior. This issue can be addressed by applying a class-wise weight to the loss function to force learning of rare anomalies during training.

That is, the DSCNN can include a class-wise imbalance loss function to address class-wise imbalances in the training data. This can include analyzing, during the forward pass, with the DSCNN a batch of the plurality of tiles to produce $n_t$ softmax vectors $\{q\}$ each of length $n_{classes}$ containing class-wise pseudo-probabilities, reducing pixel-wise losses between the class-wise pseudo-probabilities and the labeled pixels of the batch of the plurality of tiles in successive batches by modifying the kernel weights and biases according to a loss function, during the backward pass, and finally mitigating the class-wise imbalance by multiplicatively applying class-wise balancing weights to the pixel-wise losses.

Figure 5:
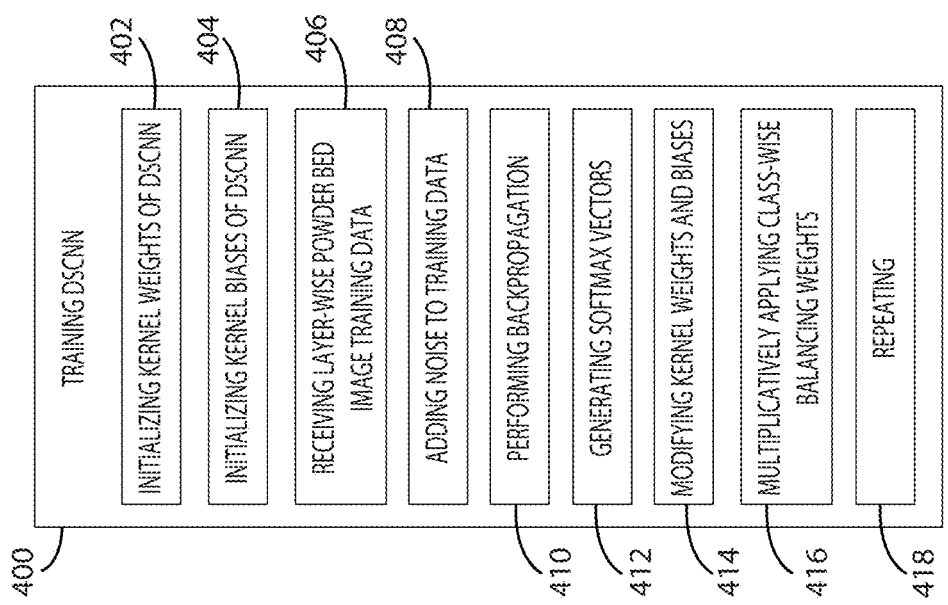
FIG. 5 illustrates a flowchart of a training method for a dynamic segmentation convolutional neural network in accordance with one embodiment of the present disclosure.

Referring to FIG. 5, one embodiment for training a DSCNN 400 in accordance with the present disclosure is illustrated. The computer-implemented method for training the DSCNN enables the trained model to classify anomalies in images. The compute-implemented method is directed to training the DSCNN with layer-wise powder bed additive manufacturing training data.

The method includes initializing kernel weights of convolutional layers and fully connected layers of the DSCNN 402 and also initializing kernel biases of the DSCNN 404.

The method includes receiving layer-wise powder bed image training data 406. The training data can be prepared by a user or received from an external source. The training data includes a tiles and corresponding pixel labels that represent the ground truth. A subset of the ground truth pixel labels are noisy pixel labels and the layer-wise powder bed image training data is class-wise unbalanced.

The training method includes adding noise to a portion of the layer-wise powder bed image training data 408. The noise disrupts reliance on image texture for classification, without altering the mean intensity of the data. The noise forces at least part of the DSCNN to learn low-frequency morphological features while preserving textural features for classification in a remaining portion of the layer-wise powder bed image training data in which no noise is added.

With training data annotated, labeled, and augmented, the computer implemented method includes executing one or more executable programs in order to perform backpropagation 410 via forward passes in the DSCNN and backwards passes in the DSCNN. This involves performing convolution operations on the plurality of tiles of training data. The method also includes generating softmax feature vectors 412. Specifically, the computer-method includes producing $n_t$ softmax vectors $\{q\}$ each of length $n_{classes}$ containing class-wise pseudo-probabilities in response to the convolution operations. The method further includes modifying the kernel weights and biases according to a loss function 414. The loss function reduces pixel-wise losses in successive batches between the class-wise pseudo-probabilities and the labeled pixels of the batch of the plurality of tiles during the backward pass. The method includes mitigating the class-wise imbalance by multiplicatively applying class-wise balancing weights to the pixel-wise losses 416. The executing, analyzing, reducing, and mitigating steps are repeated 418 until the DSCNN is trained.

The computer-implemented method for training a DSCNN can include a consistency check on the ground truth pixel labels and setting losses associated with unlabeled pixels of the layer-wise powder bed image training data to zero and removing tiles from the training data with less than 10% of their pixels labeled.

DSCNN Architecture

The present disclosure provides a novel convolutional neural network ("CNN") architecture. As a subset of generalized neural networks, CNNs leverage the a priori knowledge that the data of interest are images—largely limiting their calculations to convolution (element-wise multiplication followed by summation) operations that produce responses composing the features. The term "image" may refer broadly to any data on a regular grid for which the spatial relationships between the data points on the grid encode information.

Segmentation tasks seek to classify each pixel in an image based on the value stored at the given pixel as well as information about the area surrounding that pixel. The ability to "carry" contextual information from larger size scales down to smaller size scales is well recognized. However, in those scenarios a spatial correlation still corresponds to a real-world spatial correlation. By operating in parallel, the dynamic segmentation convolutional neural network ("DSCNN") architecture can capture multi-scale information despite a lack of correspondence to real-world spatial correlation. In particular, in one embodiment the DSCNN has three legs that operate in parallel to capture information at the local, regional, and global size scales.

One leg of the DSCNN is a modified U-Net configured to extract deep morphological features while recalling their approximate spatial locations. Another leg is a simple CNN to extract features at a very large size scale. Features at this size scale can encode information about environmental lighting conditions, major powder spreading aberrations, and material feedstock characteristics. A localization leg provides pixel-wise classification at the native input resolution by translating the multi-scale contextual information into pixel-wise labels based on local areas around each pixel. The use of a parallel localization network also allows features learned for one AM machine to be applied to a different AM machine regardless of the native resolution or physical size of the imager's field of vision. Fusion of data from multiple imaging systems (the number of which may vary from machine to machine) can be handled via a dynamic resizing of the initial feature extractor kernels.

The DSCNN analyzes the input images in discrete, marginally overlapping, tiles. Tile-wise delineation of the input data prevents the graphics processing unit memory from limiting the maximum native powder bed image size as the full image is naturally broken up into mini-batches of tiles for evaluation. This can be a significant concern for desktop-level GPUs as image sizes of 10 MP or greater are considered. Further, by resizing the input tiles, the effective receptive fields of the convolutional units deeper in the network can be modified without making structural changes to the network architecture.

One embodiment of the DSCNN only has $14 \times 10^6$ learnable parameters. However, it benefits from an architecture designed specifically for segmentation of images for which important context exists at disparate size scales and its extracted features are learned on relevant data (i.e., layer-wise powder bed images). The parallelized structure and relatively shallow depth (number of sequential layers) of the network also enables high classification speeds in excess of one million pixel-labels per second.

FIG. 9 illustrates a graphical representation of one embodiment of a dynamic segmentation convolutional neural network ("DSCNN") architecture. Data volumes are approximately to scale with the channel dimensions compressed by a relative factor of ten. The numbers of channels are indicated horizontally, and the square tile spatial dimensions are indicated vertically.

The reason for the multi-scale input layer (global frame A, local frame B, regional frame C, and pixel-wise intensity coordinates frame D) is because of the DSCNN architecture. This embodiment of the DSCNN has three parallel legs that explicitly encode information at multiple size scales, which enables the use of both global and highly local information for segmentation. The overall network topology facilitates transfer learning between different AM machines. The global position of each pixel within the layer images is also explicitly encoded and preserved throughout the tiling operation. This architecture provides implicit acceptance of an arbitrary number of input channels. Further, the up-sampling architecture choices, loss functions, and data augmentation accommodate AM datasets with high-resolution images, unusual lighting environments, and major class-wise imbalances in the training data.

Embodiments of the present disclosure include analyzing image data with a DSCNN. Certain embodiments provide one or more of the following features:
  anomaly classifications (i.e., model predictions) quickly enough to provide real-time information, even at high-camera resolutions;
  pixel-wise semantic segmentation at the native resolution of an imaging device;
  knowledge transfer across entirely different powder bed machines and imaging systems, including across different AM technologies.
  fusion of data from multiple imaging devices or other spatially correlated sensing modalities.

Semantic segmentation refers to labeling pixels or groups of pixels (super-pixels) in an image as belonging to one or more human-interpretable classes. Previously implemented machine learning algorithms in this domain generally focus on classifying entire images or relatively large image regions while there may be hundreds of distinct anomaly occurrences in a single build layer. The few approaches that provide further localization, fall short in other ways.

The current embodiment of the DSCNN architecture generally mitigates the tradeoff between high resolution image segmentation and capture of large-scale contextual information. In one embodiment, the DSCNN is built around a modified U-Net core (see O. Ronneberger, P. Fischer, T. Brox, U-Net: Convolutional Networks for Biomedical Image Segmentation, (2015) 1-8. https://doi.org/10.1007/978-3-319-24574-4_28, which is hereby incorporated by reference in its entirety). The U-Net architecture deals soley with patch-wise (or tile-wise) application of the entire network. This approach places an effective limit (imposed by current GPU memory capacities) on the largest size scale from which context can be carried down to the pixel-scale. Furthermore, transferring knowledge from one image size to another assumes that features learned with the initial receptive fields will be applicable to differently-scaled receptive fields. The present disclosure utilizes parallel convolutional neural networks to capture global context and translates regional feature maps into higher resolution pixel-wise classifications, which help to address these shortcomings of the U-Net architecture.

Put succinctly, the DSCNN provides deep features by encoding information contained within a large spatial area. It also, reduces the number of feature channels to save GPU memory. And, it includes less deep, but higher resolution features via skip connections. The DSCNN architecture enables learned transfer functions to map deeper features into higher resolution.

The DSCNN is capable of robustly returning pixel-wise anomaly classifications independent of any specific imaging solution. The imaging system can capture image data in a variety of different formats, most commonly in the form of an image with pixel values. The bit depth (e.g., 8 bit or 16 bit) of the images can vary, even among cameras in the system. Exemplary approximate effective camera resolutions (i.e., the field of view of individual pixels) are provided in Table 1. However, due to off-axis mounting, some of the cameras may have perspective distortion. This distortion can be corrected, but is generally immaterial to the performance of the DSCNN.

Returning to FIG. 9, a detailed discussion of the DSCNN architecture 600 will be provided now. Three tile-wise frames (global frame A, local frame B, and regional frame C) from the input layer are fed into the three parallel neural networks 602, 604, 606 of the DSCNN. That is, for each local frame B generated by tiling the calibrated powder bed frame (that includes four images representing one layer of the powder bed) during the input layer preparation based on one layer of the powder bed three frames are fed into the DSCNN. Alternative embodiments may have additional parallel neural networks that enable capture of additional levels of scale. Eventually, the parallel legs are recombined (e.g., concatenated) to form a feature vector 608 and enable pixel-wise classification informed by the multi-scale context. For brevity, the individual hidden layers are not discussed in detail, but a brief discussion of the architecture of each parallel neural network follows.

Operating on regional frame C, the regional CNN 606 (i.e., modified U-Net) extracts regional features (i.e., features at a medium size scale). These features are referred to as medium size scale because the regional CNN extracts features at a lower scale than the global CNN 602 and a higher scale than the local CNN 604. The features are extracted at this medium scale because the regional frame C is down-sampled from the tile size to 128×128 pixels, which means the regional frame CNN generally analyzes images with pixel resolution between the local frame resolution (T×T, higher resolution) and the global frame resolution (32×32, lower resolution). Because much of the information at this size scale is morphological in nature (e.g., part or defect geometries), this is the deepest leg of the DSCNN. Table 2 enumerates the layers composing the regional CNN and is followed by a brief discussion on the chosen hyper-parameters and architecture.

TABLE 2

Regional modified U-Net architecture. All units in pixels.

| Layer | $W_i$ | $C_i$ | F | S | $W_o$ | $C_o$ |
|---|---|---|---|---|---|---|
| Down-Sample | | | | | | |
| CONV + ReLU + BN | 132 | $2n_{cam}$ | 5 | 1 | 132 | 32 |
| Crop | 132 | 32 | | | 128 | 32 |
| Max Pool | 128 | 32 | 2 | 2 | 64 | 32 |
| CONV + ReLU + BN | 64 | 32 | 5 | 1 | 64 | 64 |
| Max Pool | 64 | 64 | 2 | 2 | 32 | 64 |
| CONV + ReLU + BN | 32 | 64 | 5 | 1 | 32 | 128 |
| Max Pool | 32 | 128 | 2 | 2 | 16 | 128 |
| CONV + ReLU + BN | 16 | 128 | 5 | 1 | 16 | 256 |
| Max Pool | 16 | 256 | 2 | 2 | 8 | 256 |
| CONV + ReLU + BN | 8 | 256 | 3 | 1 | 8 | 512 |
| Max Pool | 8 | 512 | 2 | 2 | 4 | 512 |
| FC | 4 | 512 | | | 1 | 512 |
| Drop50 | 1 | 512 | | | 1 | 512 |
| Up-Sample | | | | | | |
| Up-sample NN | 1 | 512 | | | 8 | 512 |
| CONV + ReLU | 8 | 512 | 1 | 1 | 8 | 512 |
| Skip Concat | 8 | [512 512] | | | 8 | 1024 |
| CONV + ReLU | 8 | 1024 | 3 | 1 | 8 | 512 |
| Up-sample NN | 8 | 512 | | | 16 | 512 |
| CONV + ReLU | 16 | 512 | 1 | 1 | 16 | 256 |
| Skip Concat | 16 | [256 256] | | | 16 | 512 |
| CONV + ReLU | 16 | 512 | 3 | 1 | 16 | 256 |
| Up-sample NN | 16 | 256 | | | 32 | 256 |
| CONV + ReLU | 32 | 256 | 1 | 1 | 32 | 128 |
| Skip Concat | 32 | [128 128] | | | 32 | 256 |
| CONV + ReLU | 32 | 256 | 3 | 1 | 32 | 128 |
| Up-sample NN | 32 | 128 | | | 64 | 128 |
| CONV + ReLU | 64 | 128 | 1 | 1 | 64 | 64 |
| Skip Concat | 64 | [64 64] | | | 64 | 128 |
| CONV + ReLU | 64 | 128 | 3 | 1 | 64 | 64 |
| Up-sample NN | 64 | 64 | | | 128 | 64 |
| CONV + ReLU | 128 | 64 | 1 | 1 | 128 | 32 |
| Skip Concat | 128 | [32 32] | | | 128 | 64 |
| CONV + ReLU | 128 | 64 | 3 | 1 | 128 | 32 |
| Up-sample BL | 128 | 32 | | | T | 32 |

Referring to Table 2, the columns, from left-to-right, indicate the type of network layer, the input spatial size $W_i$, the number of input channels $C_i$, the spatial size of the kernel F, the stride of the kernel S, the output spatial size $W_o$, and the number of output channels $C_o$. The number of data sources (e.g., cameras) is represented by $n_{cam}$. As an example, the regional modified U-Net begins by operating on regional frame C with a convolution ("CONV") layer composed of 32 kernels (a.k.a. filters) of size 5 pixels×5 pixels×$2n_{cam}$ pixels. The CONV layer is followed by a cropping operation that removes the explicit padding added during the tiling operation. This can remove edge effects at the borders between tiles in the final segmentation results by ensuring that none of the features leaving the first CONV layer are influenced by TensorFlow's implicit padding.

Following the CONV layer, activation function ("ReLU") and Batch Normalization ("BN") layers are applied as implemented in TensorFlow. Max Pooling is then used to reduce the dimensionality of the model and increase the effective size of the receptive fields of subsequent convolution kernels while preserving the strongest kernel responses. The output spatial sizes of the CONV and Max Pooling layers can be calculated according to Equation (1); where the implicit padding P is handled by TensorFlow such that $W_o \equiv W_i$ for all strides equal to one.

$$W_o = \left(\frac{W_i - F + 2P}{S}\right) + 1 \quad (1)$$

The first portion of the modified U-Net collapses the multi-mode spatially-defined information contained within the tile into a single feature vector using a Fully Connected ("FC") layer. The FC layer is followed by a canonical dropout layer ("Drop50") which randomly disables different 50% sets of the inputs into the FC layer during training to improve the robustness of the learned features. The second portion of the modified U-Net expands this feature vector back out to each pixel in the original 128 pixels×128 pixels tile. Each expansion step includes the following operations that are also shown graphically in FIG. 8,9.

The input data volume is up-sampled using a nearest-neighbor ("NN") operation.

A CONV layer with 1 pixel×1 pixel kernels is applied in order to reduce the number of feature channels in order to conserve memory on the GPU while allowing the network to preserve the encoded information in a set of more compressed/complex features.

The data volume is then channel-wise concatenated with a copy of the corresponding data volume from the feature encoding side (first portion) of the modified U-Net 606, where the corresponding data volume has the same spatial size as the up-sampled data volume. Skip connections are shown in FIG. 9. as hollow data volumes with dotted borders linked to hollow data volumes with solid borders.

A CONV layer with 3 pixels×3 pixels kernels is applied to map the deeper features spatially by considering the spatial information preserved during the first portion of the modified U-Net. These CONV layers are also designed to collapse the number of feature channels after the concatenation operation increases them.

An activation function (ReLU) is applied at each CONV layer, but batch normalization is not used in this portion of this embodiment.

Taken together, these operations can be considered a learned upsampling operation, sometimes referred to as fractionally-strided convolution, or up-convolution. The current embodiment of the DSCNN collapses to a single feature vector in the first portion instead of a data volume with a non-unity spatial size. This ensures that contextual information from the entire region covered by the tile can be used to inform the pixel-wise classifications. Because the tile size is one of the hyperparameters exposed to the user, this can improve the overall interpretability of the algorithm's behavior. Finally, the output of the modified U-Net is up-sampled using bilinear interpolation (BL), or another upsampling technique, to the native tile size T pixels×T pixels.

Operating on the global frame A, the global CNN 602 extracts features at a large size scale which nominally describe the state of the entire powder bed. Because the number of truly unique input datums for this size scale number is in the tens to hundreds (the number of annotated powder bed layers) instead of tens of millions (the number of pixels), the number of parameters for this leg is kept relatively low to protect its generalizability. In other words, there is a risk that insufficient variation can be captured in the training sample to ensure robustness of the network to the variations extant in the population. Similarly, reduction of the variation possible within the population can factor into limiting the global frame size, for example in this embodiment it was limited to only 32 pixels×32 pixels at least in part for this reason. Table 3 enumerates the layers of the global CNN 602 of the current embodiment.

TABLE 3

Global CNN architecture. All units in pixels.

| Layer | $W_i$ | $C_i$ | F | S | $W_o$ | $C_o$ |
|---|---|---|---|---|---|---|
| CONV + ReLU | 36 | $2n_{cam}$ | 5 | 1 | 36 | 32 |
| Crop | 36 | 32 | | | 32 | 32 |
| Max Pool | 32 | 32 | 2 | 2 | 16 | 32 |
| CONV + ReLU | 16 | 32 | 5 | 1 | 16 | 64 |
| Max Pool | 16 | 64 | 2 | 2 | 8 | 64 |
| CONV + ReLU | 8 | 64 | 5 | 1 | 8 | 128 |
| Max Pool | 8 | 128 | 2 | 2 | 4 | 128 |
| FC | 4 | 128 | | | 1 | 256 |
| Drop50 | 1 | 256 | | | 1 | 256 |
| FC | 1 | 256 | | | 1 | 16 |
| Drop50 | 1 | 16 | | | 1 | 16 |
| Up-sample BL | 1 | 32 | | | T | 32 |

The output of the global CNN 602 is up-sampled from a single feature vector to the native tile size T pixels×T pixels. Prior to up-sampling, the number of channels is reduced from 256 to 16 using a fully connected layer to emphasize the more local information (over the global information) in the final pixel-wise classifications. Two dropout layers are included in this leg to mitigate overfitting of this portion of the model. Also, note that because the feature vector output by the global CNN 602 is identical for all tiles in a powder bed layer, it can be computed once per layer to save resources.

Data encountered by the global CNN 602 during training are rarely unique. As an example, training the DSCNN on one print job for one AM machine the DSCNN might encounter upwards of 20 million unique pixels, 100 unique tiles, but only 1 unique global image stack. Keeping the size of the global convolutional neural network small can help to mitigate potential overfitting due to encountering the same training data.

Operating on the local frame B, the localization CNN 604 maps the information captured and encoded at the larger size scales to the original image pixels. This leg of the DSCNN, combined with the ability to resize the input tiles in their native resolution, is responsible for ensuring the model's agnosticism to the AM machine and imaging system. Table 4 enumerates the layers of the localization CNN 604 of the current embodiment.

TABLE 4

Localization network architecture. All units in pixels.

| Layer | $W_i$ | $C_i$ | F | S | $W_o$ | $C_o$ |
|---|---|---|---|---|---|---|
| CONV + ReLU | T + 5 | $2n_{cam}$ | 11 | 1 | T + 5 | 128 |
| | T + 5 | 128 | | | T | 128 |

The localization CNN 604 includes a single CONV layer followed by a ReLU activation function. Because this leg of the network operates on input data of arbitrary spatial dimensions, no pooling operations or deeper layers are implemented. The output of the localization network is a set of feature vectors—one for each pixel in the original (i.e., native resolution) tile. Each of these feature vectors encodes information about the local region around each pixel as well as relationships between the post-spreading and post-join (e.g., fusion/binder-deposition) images from one or more cameras.

Pixel-Wise Classification

DSCNN captures contextual information at multiple size scales and combines that information with highly local information to enable pixel-wise classifications. To achieve this, the outputs of the three legs (i.e., global, regional, and local neural networks) are concatenated together along with the (x, y) coordinates of each pixel (pixel coordinates frame D). Table 5 describes the concatenation process as well as the subsequent layers required for pixel-wise classification.

TABLE 5

Combination of multi-scale features. All units in pixels.

| ayer | $W_i$ | $C_i$ | F | S | $W_o$ | $C_o$ |
|---|---|---|---|---|---|---|
| Concat | T | [128 16 32 2] | | | T | 178 |
| Classification | T | 178 | 1 | 1 | T | $n_{classes}$ |
| Softmax | T | $n_{classes}$ | | | T | $n_{classes}$ |

The result of the concatenation is a 178-element feature vector 608 capturing context at multiple size scales for each pixel in the original tile. The classification layer 610 is essentially a channel-wise 1 pixel×1 pixel convolution operation that collapses the number of feature channels from 178 to the number of anomaly classes ($n_{classes}$) for the given AM machine.

The $n_{classes}$ long anomaly class prediction vector 614 at each pixel may be considered a distribution of responses—one for each anomaly class. For example, where the ground truth is that a particular pixel depicts anomaly class #5, the DSCNN will produce a high response value in the element of the prediction vector 614 corresponding to anomaly class #5 for that pixel, and low responses in all other elements. This distribution of class-wise responses {p} (of arbitrary absolute magnitude) are rescaled as pseudo-probabilities {q}∈(0, 1] such that Σ{q}=1 using the softmax function 612 given in Equation (2).

$$q_j(\{p\}, j) = \frac{e^{p_j}}{\sum_{k=1}^{n_{classes}} e^{p_k}} \quad (2)$$

Where q, p, and $n_{classes}$ have been previously defined and j∈[0,$n_{classes}$).

The current embodiment of the DSCNN architecture balances the effective receptive fields of the kernels, layer classification time, classification performance metrics, practical available GPU RAM, and the total number of learnable parameters, among other factors. At 13,996,612+179 ($n_{classes}$+1) learnable parameters (kernel weights, biases, and batch normalization distribution statistics) the network is relatively small by many modern standards. Alternative embodiments may take a different approach and balance these, and other factors differently, perhaps resulting in a deeper DSCNN network.

Heuristic Augmentation of Segmentation Results

As depicted in FIG. 7, the raw DSCNN predictions can be augmented with heuristics. Exemplary heuristic augmentations include:

For the EOS M290, if debris detections are directly on top of expected part locations, switch to part damage.

For the EOS M290, if part, super-elevation, or swelling detections are far away (more than 1100 μm) from expected part locations, switch to debris. Because part, super-elevation, and swelling cannot, by definition, occur in the absence of intentionally fused material (misprints have not been observed for the EOS M290) any such DSCNN predictions are incorrect. The heuristic leverages this a priori knowledge about the process to improve the results presented to the user.

For the ConceptLaser M2 machine, if part detections are far away (more than 350 μm) from expected part locations, the anomaly is switched to a misprint. The tighter dimensional tolerance (relative to the EOS M290 heuristics) is enabled by more accurate registration between the powder bed imaging data and the CAD geometries for this machine.

The current embodiment does not include CAD geometry as an input. One exemplary reason for this is because misprints may become difficult to detect if the DSCNN learns to make part predictions based primarily on the CAD geometry as opposed to being based on the post-join images. In alternative embodiments, CAD geometry can be included as a DSCNN input channel.

Transfer Learning

The DSCNN provides suitable transferal of learned knowledge between additive manufacturing machines. Consider machine-type #1 for which a great deal of labeled data is available and machine-type #2 for which a relatively smaller number of labeled targets exist. In this case, machine-to-machine transfer learning can proceed as follows.

First, a DSCNN is trained on machine-type #1 data with all learnable parameters initialized randomly. Then, a DSCNN for machine-type #2 is largely initialized using the learned parameters from the machine-type #1 DSCNN. Owing to tile resizing and the fully convolutional nature of the localization network, only the final classification layer is initialized randomly—under the assumption that the two machines will have different anomaly classes. In the current implementation, parameters throughout the entire depth of the DSCNN are free to be re-learned during transfer learning. The batch statistics learned by the Batch Normalization layers are also reset during transfer learning as they are expected to be substantially different between different machine types.

Knowledge can be transferred between two machines with different numbers of camera systems. As an example, if machine-type #1 has one camera (α) and machine-type #2 has two cameras (α and β), the weights $\omega_{2\alpha}$ and $\omega_{2\beta}$ (for both the post-join and post-spreading channels) will be initialized by the weights $\omega_{1\alpha}$ from machine-type #1. Because the number of channels of the data volume produced by the first CONV layer is fixed by the number of kernels (See Table 2), it is invariant to the number of cameras—preserving the machine-agnostic architecture of the deeper layers.

The presented architecture is nominally transferable to a variety of powder bed AM machines and imaging configurations. Further, in total, the entire process of analyzing a build from a brand new AM powder machine can take the user less than a day, start-to-finish. Assuming that sufficient data have already been collected and with the understanding that more labeled data can be expected to improve the model predictions.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A computer-implemented method for anomaly detection of a powder bed additively manufactured part based on layer-wise powder bed image data of a powder bed additive manufacturing machine, the computer-implemented method comprising:
additively manufacturing a part, with a powder bed additive manufacturing machine, by layer-wise addition of powder to a powder bed;
receiving layer-wise powder bed image data from an in situ imaging system physically integrated with the powder bed additive manufacturing machine, the layer-wise powder bed image data representing a build layer of powder additively manufactured in the powder bed of the additive manufacturing machine;
preparing an input layer for a trained dynamic segmentation convolution neural network ("DSCNN") configured to systematically classify layer-wise spatial anomalies by processing multi-scale, spatially registered image data to encode a build layer frame at multiple scales for segmentation, wherein the input layer includes:
a global scale image stack generated by down-sampling each image of a build layer image stack to a global scale shared pixel resolution lower than a shared build layer pixel resolution;
a local scale image stack generated by dividing each image of the build layer image stack into a grid of tile images having tile pixel resolution selected to capture contextual information at local size scale;
a regional scale image stack generated by down-sampling each tile image to a regional scale shared resolution lower than the tile pixel resolution;
a normalized pixel coordinate image stack mapping tile pixel positions relative to powder bed positions, wherein the mapping provides positional context for differentiating anomalies from background features;
processing the prepared input layer with the DSCNN to identify anomalies based on learned features specific to powder bed manufacturing, wherein the anomalies include defects relating to one or more of layer spreading, recoater streaks, and material ejecta patterns detected as morphological features distributed across the build layer;
classifying pixel-wise the multi-scale features into powder bed anomaly classifications indicative of anomalies of the powder bed additively manufactured part;
providing to a user interface an output indicative of one or more anomalies of the powder bed additively manufactured part; and
displaying, via a manufacturing control interface, a visualization of the detected anomalies that quantitatively reflects their spatial distribution, severity, and morphological characteristics.

2. The computer-implemented method of claim 1 including:
convoluting the input layer with the trained DSCNN to generate multi-scale features for powder bed anomaly classification of the layer-wise powder bed image data, wherein the trained DSCNN is machine-agnostic with respect to the powder bed additive manufacturing machine and the imaging system;
wherein the displaying, via a manufacturing control interface, the visualization of the detected anomalies is in conjunction with ex-situ data related to the additively manufactured part; and
wherein the DSCNN is trained using a training dataset that includes images from multiple additive manufacturing machines to facilitate robustness.

3. The computer-implemented method of claim 1 wherein the layer-wise powder bed image data from the imaging system is received over a plurality of different input channels that includes different explicit channels associated with at least one of different imaging devices and different sensing modalities of the imaging system, each explicit channel including one or more implicit channels.

4. The computer-implemented method of claim 3 including
evaluating whether layer-wise powder bed image data associated with a selected explicit channel is within a target reference frame;
calibrating the selected explicit channel according to the target reference frame in response to the selected explicit channel not being within the target reference frame; and
skipping calibration of the selected explicit channel according to the target reference frame in response to the selected explicit channel being within the target reference frame.

5. The computer-implemented method of claim 4 wherein the calibrating the selected explicit channel according to the target reference frame includes
delineating a field of view for a calibration image corresponding to a printable area within the powder bed by marking a target field of view,
cropping the layer-wise powder bed image data to the field of view for the selected explicit channel according to the target reference frame,
generating perspective, lighting, and color corrections, and
storing calibration settings in a calibration file.

6. The computer-implemented method of claim 1 comprising
centering a pixel-wise intensity of each tile image according to a global mean intensity, and
storing the pixel-wise intensity-centered tile in memory.

7. The computer-implemented method of claim 2 wherein convoluting the input layer with the DSCNN includes:
convoluting the global scale convolutional neural network input with a global convolutional neural network configured to extract global scale features indicative of at least one of powder spreading aberrations, environmental lighting conditions, and material feedstock characteristics;
convoluting the localization convolutional neural network input with a localization convolutional neural network configured to extract local features for translating multi-scale contextual information into pixel-wise labels based on local areas around each pixel; and
convoluting the regional scale convolutional neural network input with a regional convolutional neural network configured to extract morphological features hidden at the global size scale and local size scale.

8. The computer-implemented method of claim 7 wherein the local convolutional neural network is free from pooling operations and deeper layers to ensure acceptance of local convolutional neural network input having arbitrary spatial dimensions, wherein output of the localization convolutional neural network is a set of feature vectors for each pixel in the tile image.

9. The computer-implemented method of claim 7 wherein the regional scale convolutional neural network includes a convolution layer with 1 pixel×1 pixel kernels applied to reduce the number of feature channels to conserve memory on a graphics processing unit while allowing the regional scale convolutional neural network to preserve encoded information.

* * * * *